(12) United States Patent
Cohen

(10) Patent No.: US 8,723,879 B2
(45) Date of Patent: May 13, 2014

(54) TECHNIQUES FOR REDUCING NOISE WHILE PRESERVING CONTRAST IN AN IMAGE

(75) Inventor: Noy Cohen, Tel-Aviv (IL)

(73) Assignee: DigitalOptics Corporation Europe Limited, Ballybrit, Galway (IE)

( * ) Notice: Subject to any disclaimer, the term of this patent is extended or adjusted under 35 U.S.C. 154(b) by 598 days.

(21) Appl. No.: 12/996,284

(22) PCT Filed: Jun. 5, 2009

(86) PCT No.: PCT/IB2009/006257
§ 371 (c)(1),
(2), (4) Date: Dec. 3, 2010

(87) PCT Pub. No.: WO2009/147535
PCT Pub. Date: Dec. 10, 2009

(65) Prior Publication Data
US 2011/0090240 A1    Apr. 21, 2011

Related U.S. Application Data

(60) Provisional application No. 61/059,450, filed on Jun. 6, 2008.

(51) Int. Cl.
G09G 5/02    (2006.01)
(52) U.S. Cl.
USPC .......................................................... 345/589
(58) Field of Classification Search
None
See application file for complete search history.

(56) References Cited

U.S. PATENT DOCUMENTS

| | | |
|---|---|---|
| 6,633,683 B1 | 10/2003 | Dinh et al. |
| 7,616,829 B1 | 11/2009 | Bilbrey et al. |
| 7,657,098 B2 | 2/2010 | Lin et al. |
| 7,983,503 B2 | 7/2011 | Vakrat et al. |
| 2003/0026495 A1 | 2/2003 | Gondek et al. |
| 2003/0053711 A1 | 3/2003 | Kim |
| 2005/0100235 A1 | 5/2005 | Kong et al. |
| 2006/0050783 A1 | 3/2006 | Le Dinh et al. |

(Continued)

FOREIGN PATENT DOCUMENTS

| | | |
|---|---|---|
| EP | A-1 289 309 | 3/2003 |
| EP | A-1 315 367 | 5/2003 |

(Continued)

OTHER PUBLICATIONS

Notification Concerning Transmittal of International Preliminary Report on Patentability received in Application Serial No. PCT/IB09/06257 dated Dec. 16, 2010 (10 pages).

(Continued)

Primary Examiner — Kee M Tung
Assistant Examiner — Haixia Du
(74) Attorney, Agent, or Firm — Hickman Palermo Truong Becker Bingham Wong LLP

(57) ABSTRACT

A system and method for reducing noise in images is disclosed. The present invention reduces noise and preserves contrast of an image to be displayed, the image having pixels, by (1) comparing a value of a first pixel to values of a set of other pixels; (2) comparing values of pixels neighboring the first pixel to values of further pixels neighboring the set of other pixels; (3) determining, for each pixel in the set of other pixels, a weight based on results of steps (1) and (2); (4) calculating a de-noised pixel value based on the weights of each pixel in the set of other pixels; and (5) replacing the value of the first pixel with the de-noised pixel value.

35 Claims, 19 Drawing Sheets

(56) References Cited

U.S. PATENT DOCUMENTS

| | | |
|---|---|---|
| 2006/0245506 A1 | 11/2006 | Lin et al. |
| 2008/0019605 A1 | 1/2008 | Yea et al. |
| 2008/0192064 A1 | 8/2008 | Hong et al. |
| 2008/0259190 A1* | 10/2008 | Bosco et al. ............. 348/272 |
| 2009/0154828 A1 | 6/2009 | Levy et al. |
| 2010/0296737 A1 | 11/2010 | Lin et al. |
| 2011/0090240 A1 | 4/2011 | Cohen |
| 2012/0155783 A1 | 6/2012 | Huang et al. |
| 2012/0224784 A1 | 9/2012 | Cohen et al. |

FOREIGN PATENT DOCUMENTS

| | | |
|---|---|---|
| JP | 2003-153290 | 5/2003 |
| JP | 2006-033473 | 2/2006 |
| WO | WO 2009/147535 A1 | 12/2009 |

OTHER PUBLICATIONS

Current Claims of PCT Application Serial No. PCT/IB09/06257 dated Nov. 2010 (10 pages).

Lo, H. et al., "Directional Weighting-Based Demosaicking Algorithm for Noisy CFA Environments" Multimedia and Expo, 2006 IEEE International Conference On, IEEE, Jul. 1, 2006, pp. 489-492, XP031032879, ISBN: 978-1-4244-0366-0.

Office Action, JP Application No. 2011-512240, dated Jun. 19, 2013, 3 pages.

Claims from JP Application No. 2011-512240 dated Jun. 2013, 7 pages.

Lo et al., "Directional Weighting-Based Demosaicking Algorithm for Noisy CFA Environments", IEEE, dated 2006, 4 pages.

European Patent Office, "Search Report" in application No. 09 757 888.4—1906, dated Jan. 31, 2014, 5 pages.

Current Claims in application No. 09 757 888.4—1906, dated Jan. 2014, 5 pages.

Japan Patent Office, "Office Action" in application No. 2011-512240, dated Mar. 6, 2014, 3 pages.

Current Claims in application No. 2011-512240, dated Mar. 2014, 3 pages.

\* cited by examiner

| $E_{1\_11}$ | $E_{1\_12}$ | $E_{1\_13}$ $E_{2\_11}$ | $E_{2\_12}$ | $E_{2\_13}$ $E_{3\_11}$ | $E_{3\_12}$ | $E_{3\_13}$ |
|---|---|---|---|---|---|---|
| $E_{1\_21}$ | $X_1$ | $X_2$ | $X_3$ |
| $E_{1\_31}$ $E_{4\_11}$ | $E_{1\_32}$ $E_{4\_12}$ | $E_{1\_33}$ $E_{2\_31}$ $E_{4\_13}$ $E_{9\_11}$ | $E_{2\_32}$ $E_{9\_12}$ | $E_{2\_33}$ $E_{3\_31}$ $E_{5\_11}$ $E_{9\_13}$ | $E_{3\_32}$ $E_{5\_12}$ | $E_{3\_33}$ $E_{5\_13}$ |
| $E_{4\_21}$ | $X_4$ | $X_9$ | $X_5$ |
| $E_{4\_31}$ $E_{6\_11}$ | $E_{4\_32}$ $E_{6\_12}$ | $E_{4\_33}$ $E_{6\_13}$ $E_{7\_11}$ $E_{9\_31}$ | $E_{7\_12}$ $E_{9\_32}$ | $E_{5\_21}$ $E_{9\_23}$ | $E_{5\_31}$ $E_{7\_13}$ $E_{8\_11}$ $E_{9\_33}$ | $E_{5\_23}$ |
| $E_{6\_21}$ | $X_6$ | $X_7$ | $X_8$ |
| $E_{6\_31}$ | $E_{6\_32}$ | $E_{6\_33}$ $E_{7\_21}$ | $E_{7\_32}$ | $E_{7\_33}$ $E_{8\_31}$ | $E_{8\_32}$ | $E_{8\_33}$ |

Line 502, Line 504, Line 506, Line 508, Line 510, Line 512, Line 514

TECHNIQUES FOR REDUCING NOISE WHILE PRESERVING CONTRAST IN AN IMAGE

PRIORITY INFORMATION

This application claims priority to PCT Application No. PCT/IB09/06257, entitled "TECHNIQUES FOR REDUCING NOISE WHILE PRESERVING CONTRAST IN AN IMAGE", filed Jun. 5, 2009, which claims the benefit of U.S. Provisional Application No. 61/059,450, entitled "TECHNIQUES FOR REDUCING NOISE WHILE PRESERVING CONTRAST IN AN IMAGE", filed Jun. 6, 2008, the entire contents of each of which are hereby incorporated by reference as if fully set forth herein.

FIELD OF THE INVENTION

The present invention relates to digital signal processing.

BACKGROUND

Noise is a common problem in digital images, and digital signal processing (DSP) algorithms may be used to decrease noise in digital images. For example, the noise may be random, unwanted fluctuations in pixel values that make the image look grainy. There are several de-noising algorithms currently available that aim to decrease digital image noise; however these algorithms tend to have problems separating noise and data. This is especially problematic when a digital image has fine details in a low contrast region.

Most de-noising algorithms tend to perform well on uniform areas in a digital image, but typically have substantial problems eliminating noise on edges and contours in a digital image, and in detail-rich areas of a digital image, without blurring the digital image. Here, detail-rich areas may include closely situated pixels that exhibit varying contrast levels. The problems of eliminating noise may lead to a loss of information.

What is needed are techniques that solve the issues described above without adversely affecting other characteristics of an image.

BRIEF SUMMARY

This invention relates to digital signal processing. A system according to an embodiment of this invention reduces noise in an image containing pixels. The system includes a distance calculator, a weight calculator, and a de-noised pixel calculator. The distance calculator compares a value of a first pixel with values of a set of other pixels, where the first pixel and the set of other pixels are each of a first color, and compares values of pixels neighboring the first pixel with values of further pixels neighboring the set of other pixels, where the pixels neighboring the first pixel and the further pixels neighboring the set of other pixels are one of the first color, a second color, and a third color. The weight calculator determines, for each pixel in the set of other pixels, a weight based on results of the distance calculator. And finally, the de-noised pixel calculator calculates a de-noised pixel value based on the weights of each pixel in the set of other pixels, and replaces the value of the first pixel with the de-noised pixel value.

A method according to an embodiment of this invention reduces noise in an image containing pixels. The method includes comparing a value of a first pixel to values of a set of other pixels, where the first pixel and the set of other pixels are each of a first color. The method also includes comparing values of pixels neighboring the first pixel to values of further pixels neighboring the set of other pixels, where the pixels neighboring the first pixel and the further pixels neighboring the set of other pixels are one of the first color, a second color, and a third color. The method further includes determining, for each pixel in the set of other pixels, a weight, calculating a de-noised pixel value based on the weights of each pixel in the set of other pixels; and replacing the value of the first pixel with the de-noised pixel value.

According to the system and the method of the present invention, noise is reduced in pixels in uniform areas of an image, in pixels along edges and contours in the image, and in pixels that lie in detail-rich areas, while preserving their contrast.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

Figure 5B:
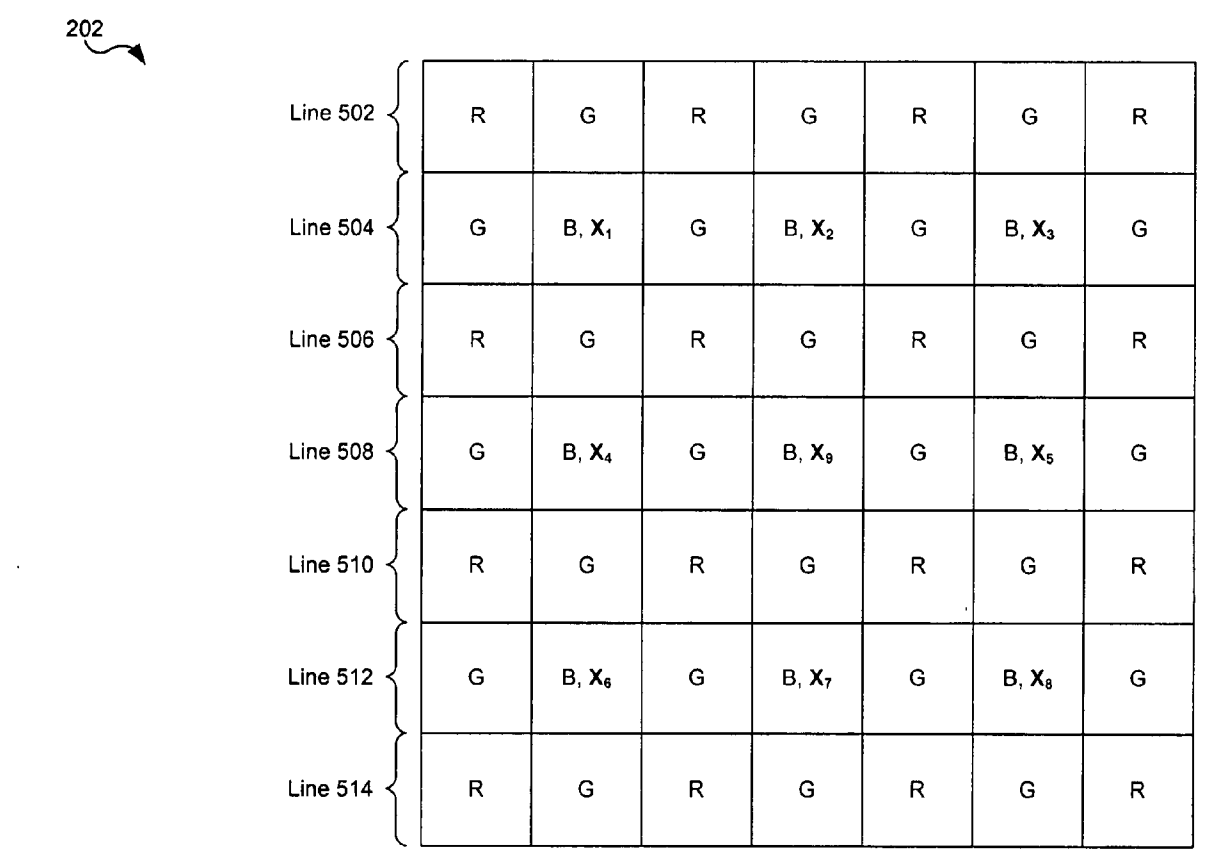

FIGS. 5A-B are example image windows according to an embodiment of the present invention.

Figure 6:
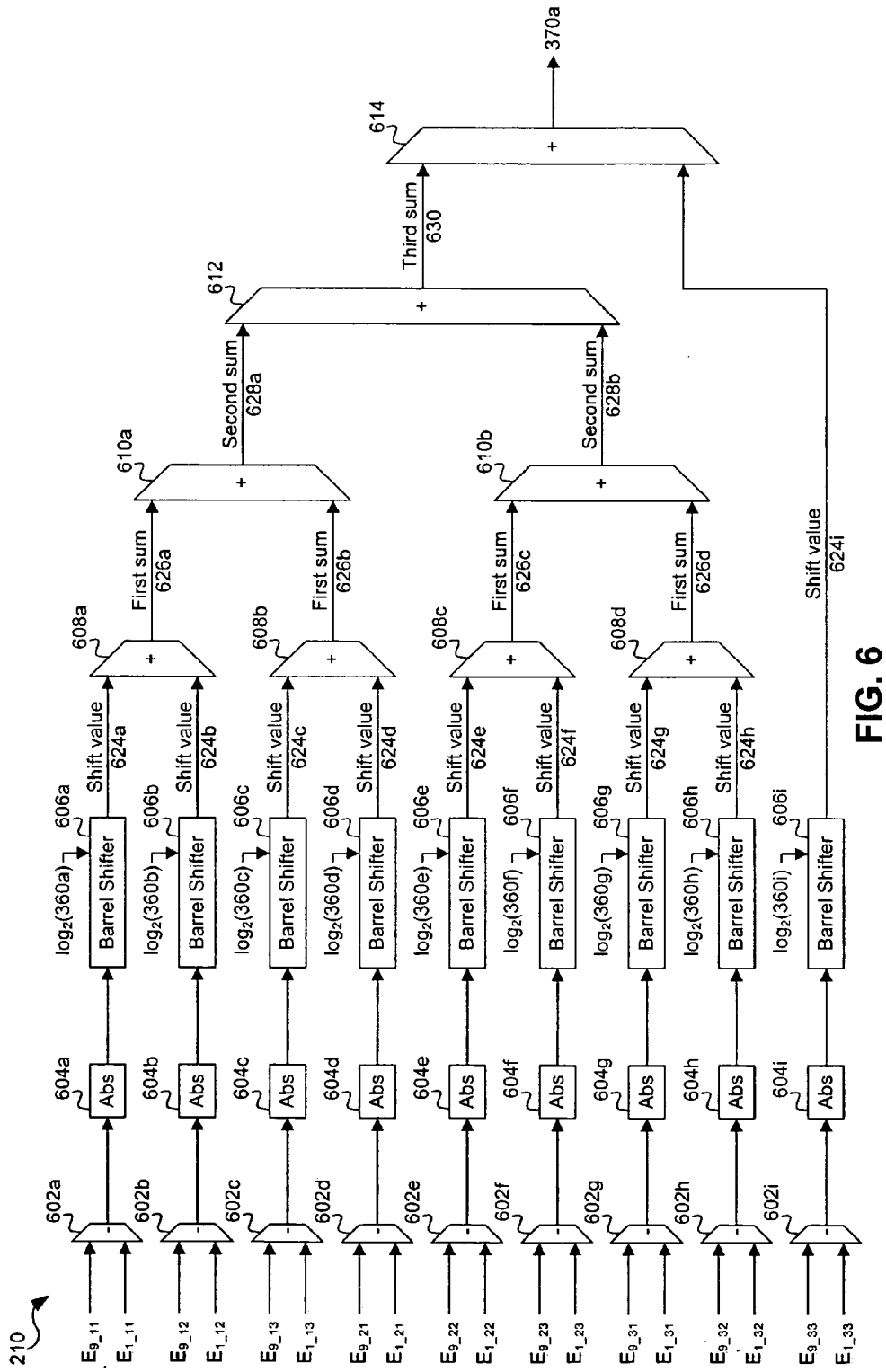

FIG. 6 is a diagram of an example distance calculator according to an embodiment of the present invention.

Figure 7A:
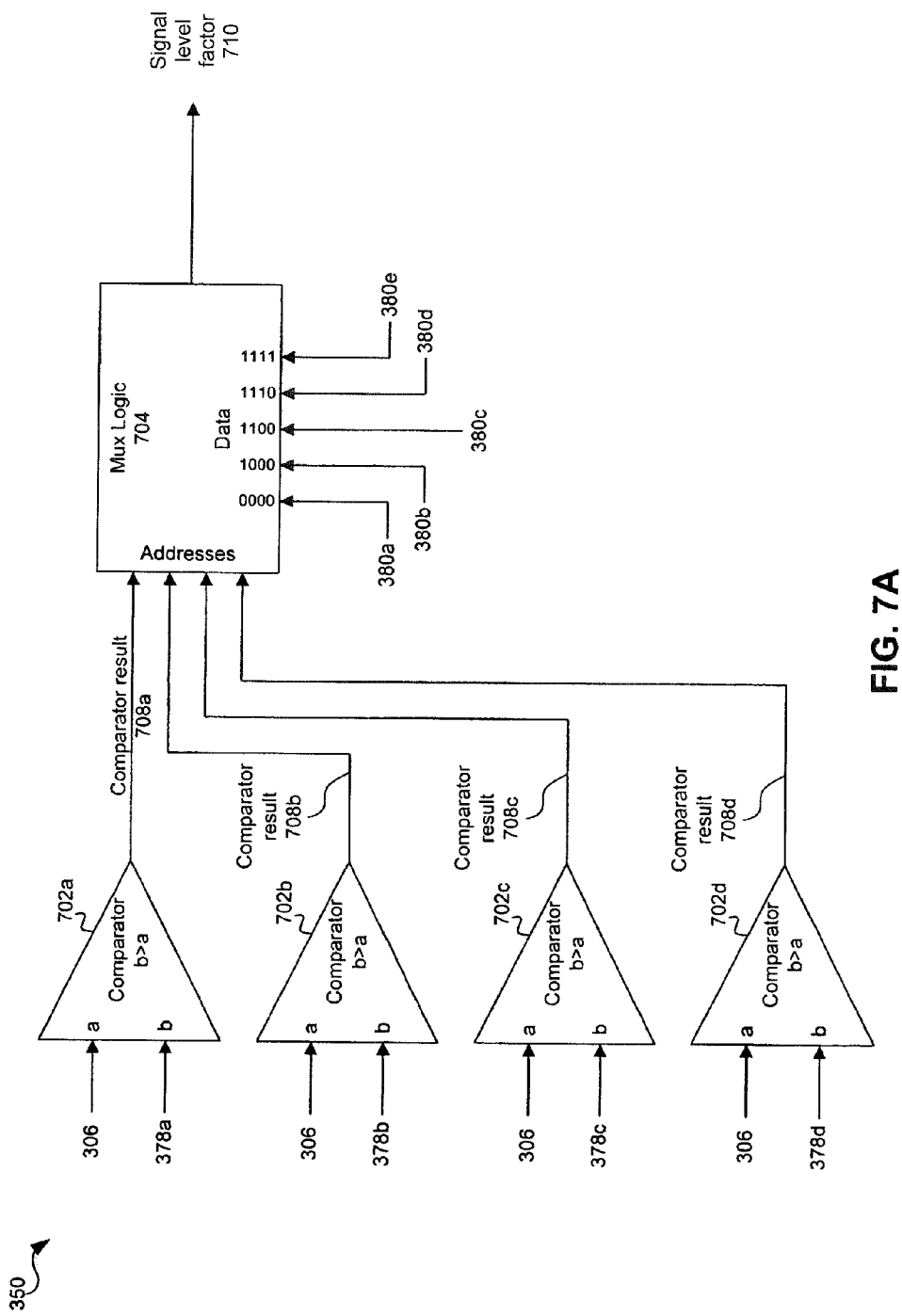
Figure 7B:
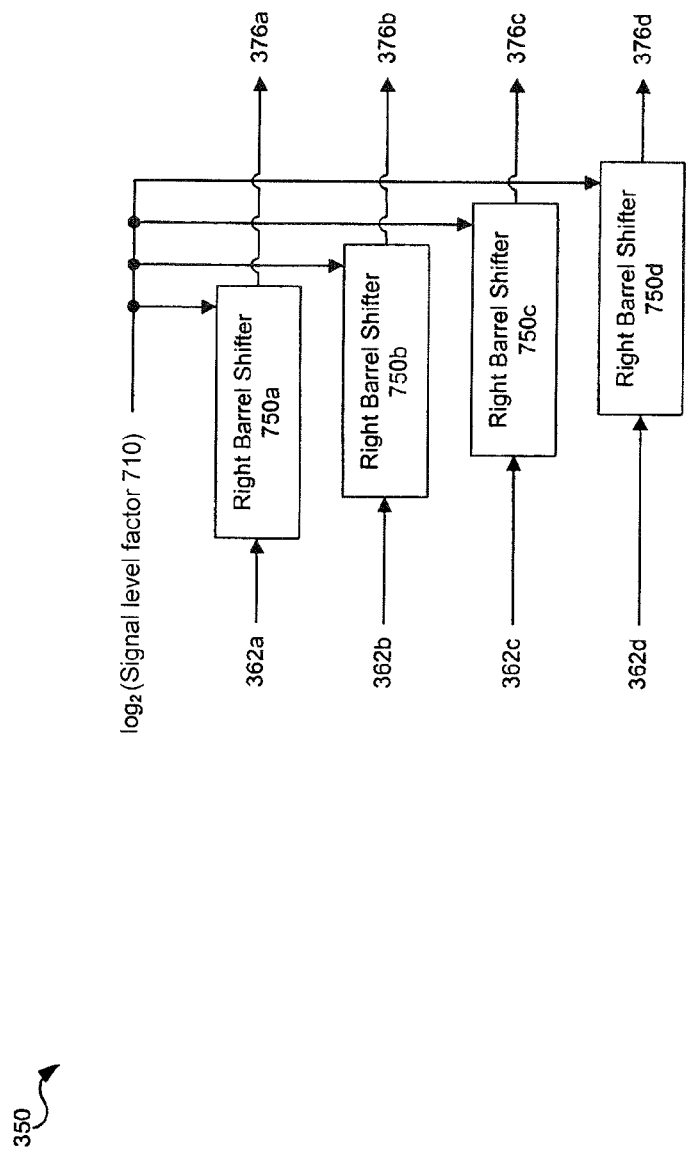

FIGS. 7A-7B are diagrams of an example parameter selector according to an embodiment of the present invention.

Figure 8:
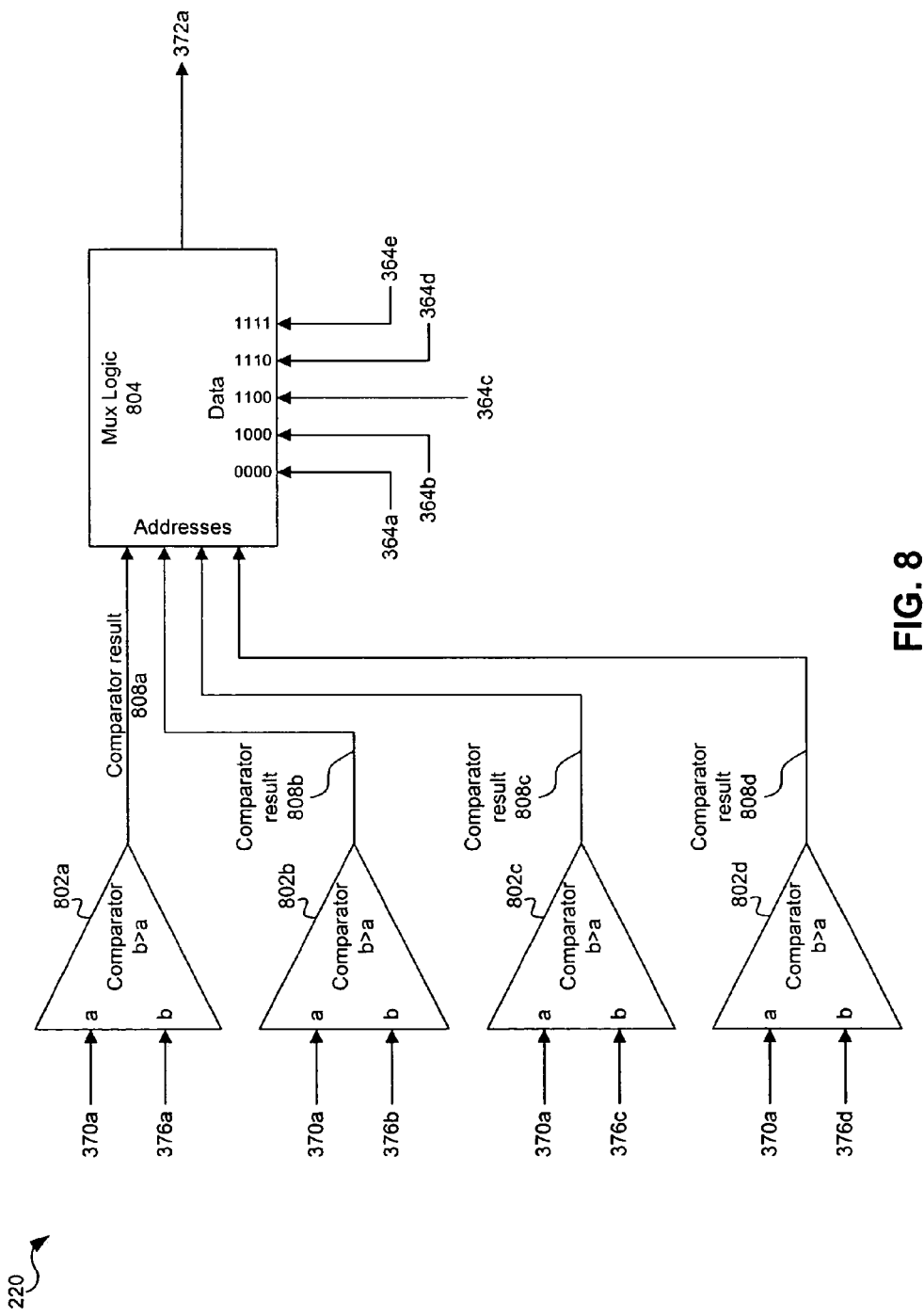

FIG. 8 is a diagram of an example weight calculator according to an embodiment of the present invention.

Figure 9:
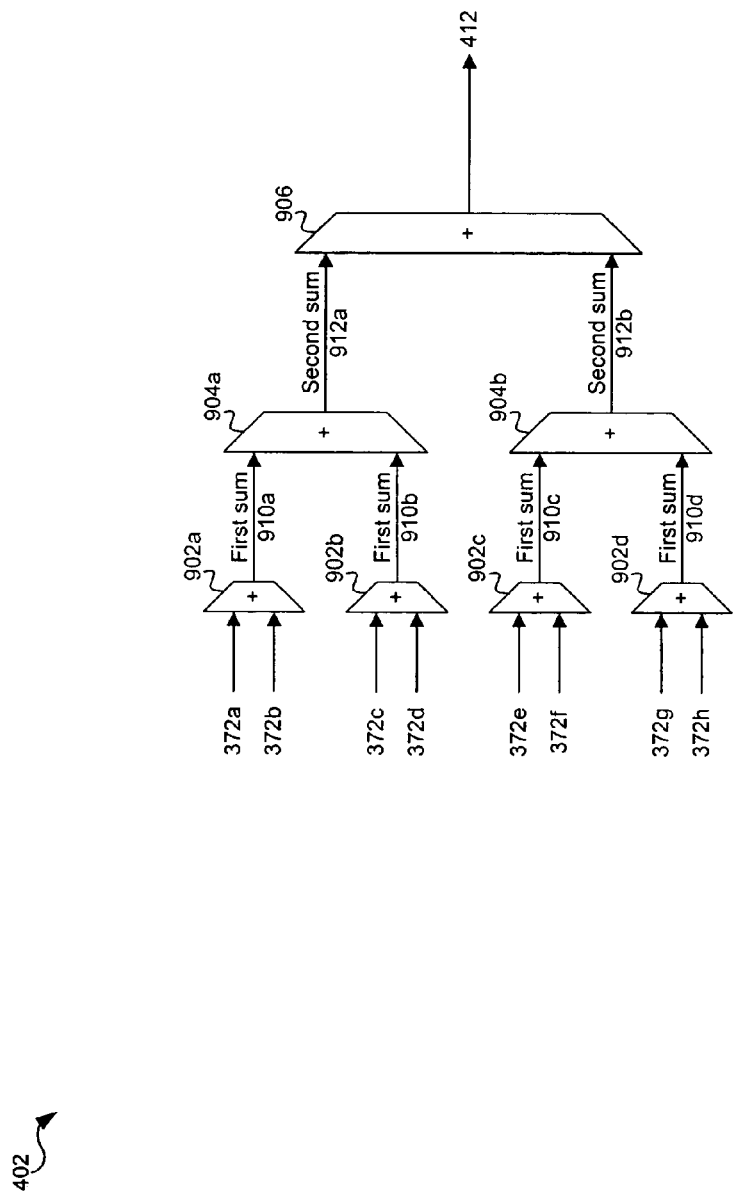

FIG. 9 is a diagram of an example weight adder according to an embodiment of the present invention.

Figure 10:
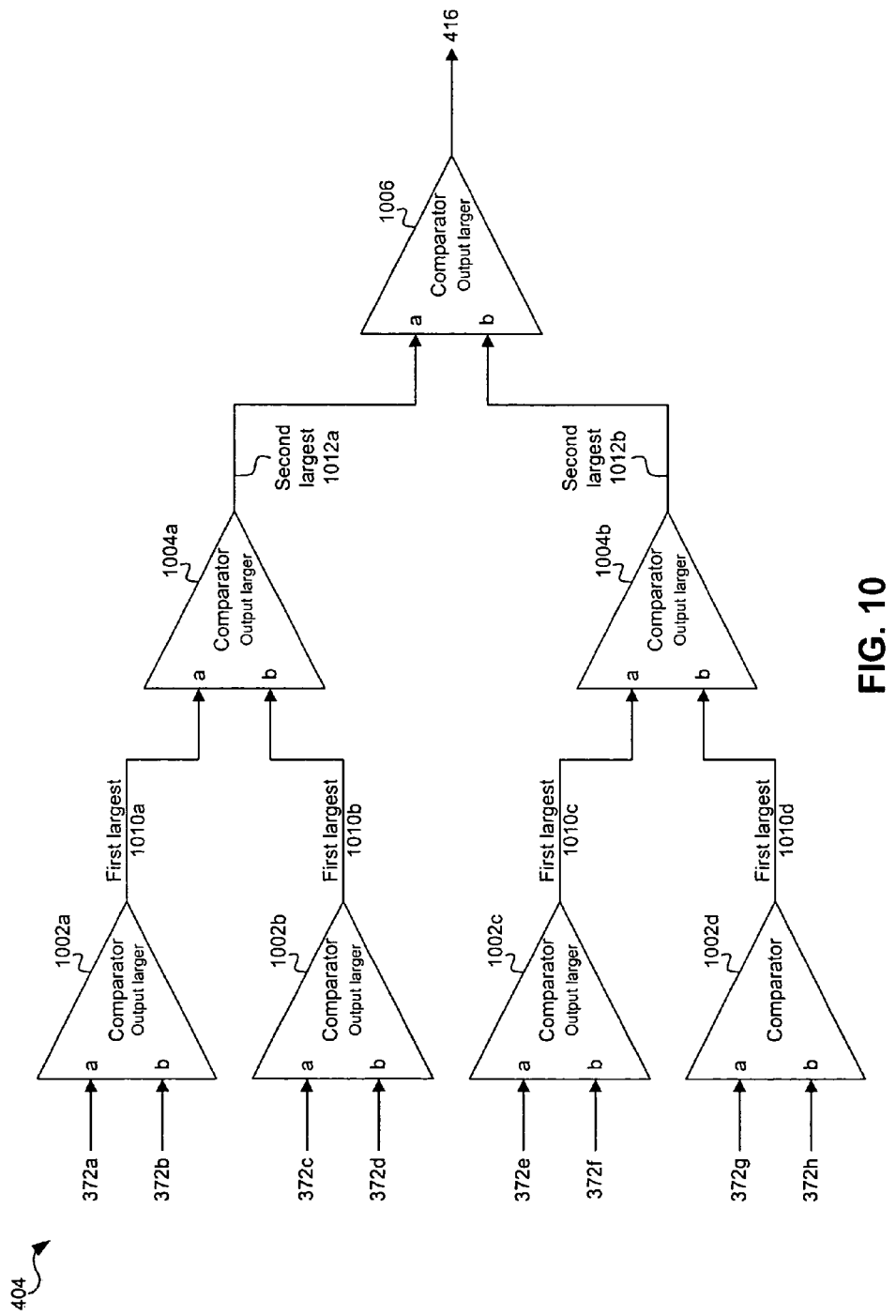

FIG. 10 is a diagram of an example maximum weight identifier according to an embodiment of the present invention.

Figure 11:
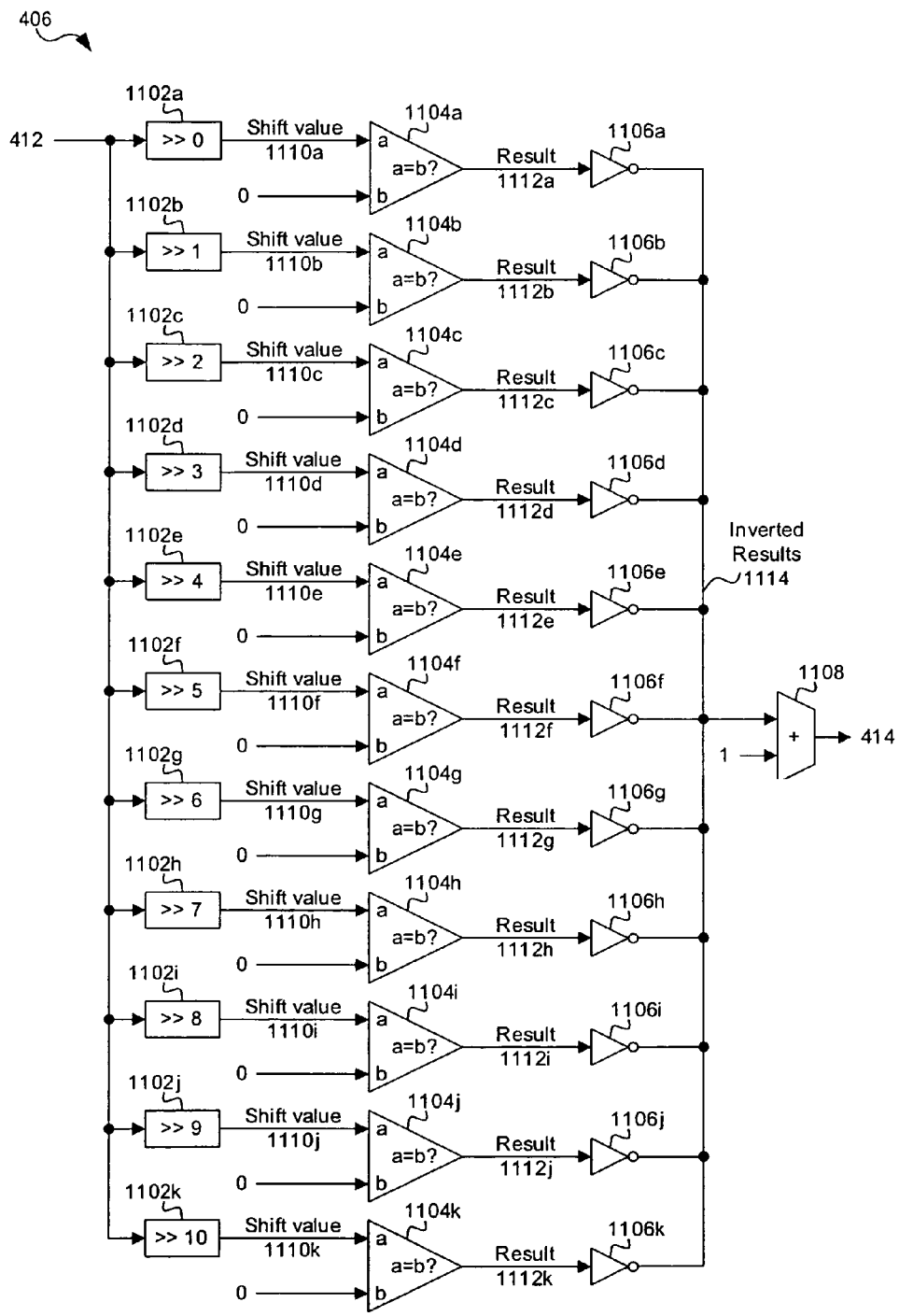

FIG. 11 is a diagram of an example minimum power-of-2 calculator according to an embodiment of the present invention.

Figure 12A:
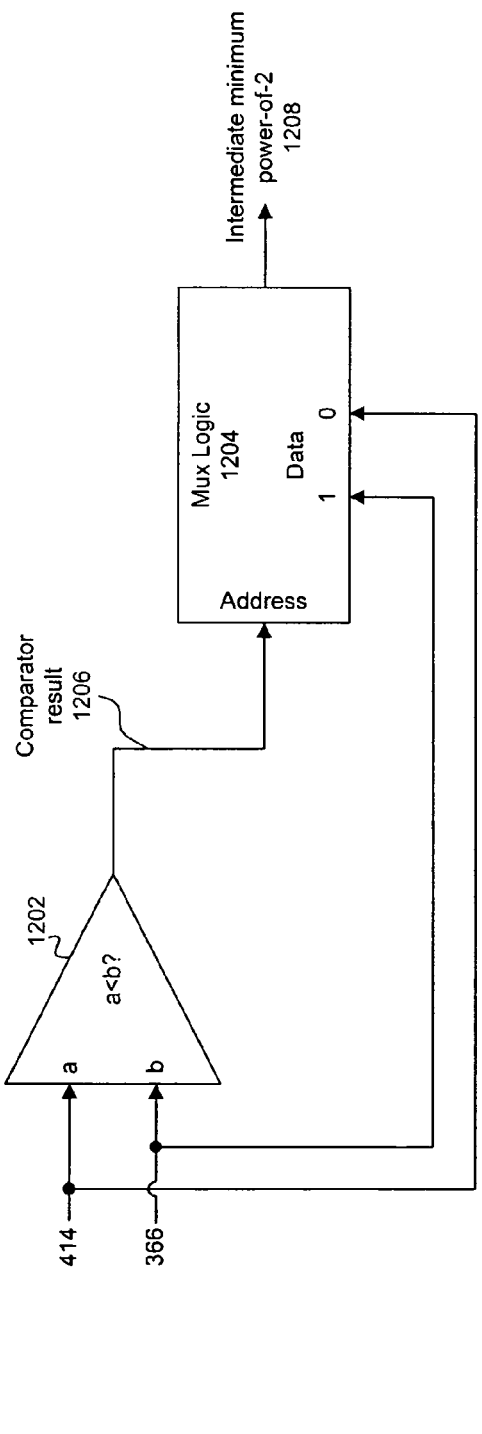
Figure 12B:
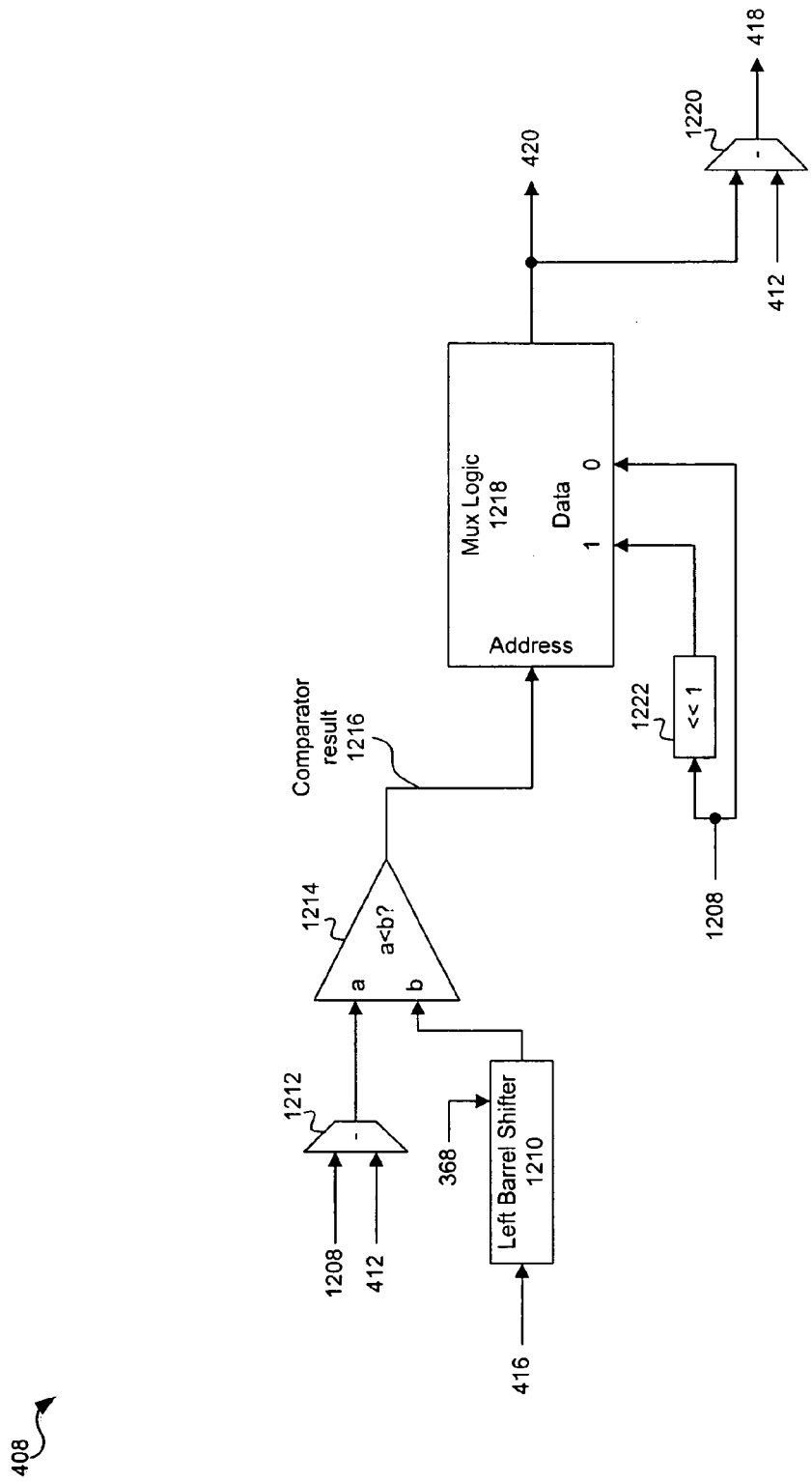

FIGS. 12A-B are diagrams of an example middle weight calculator according to an embodiment of the present invention.

Figure 13:
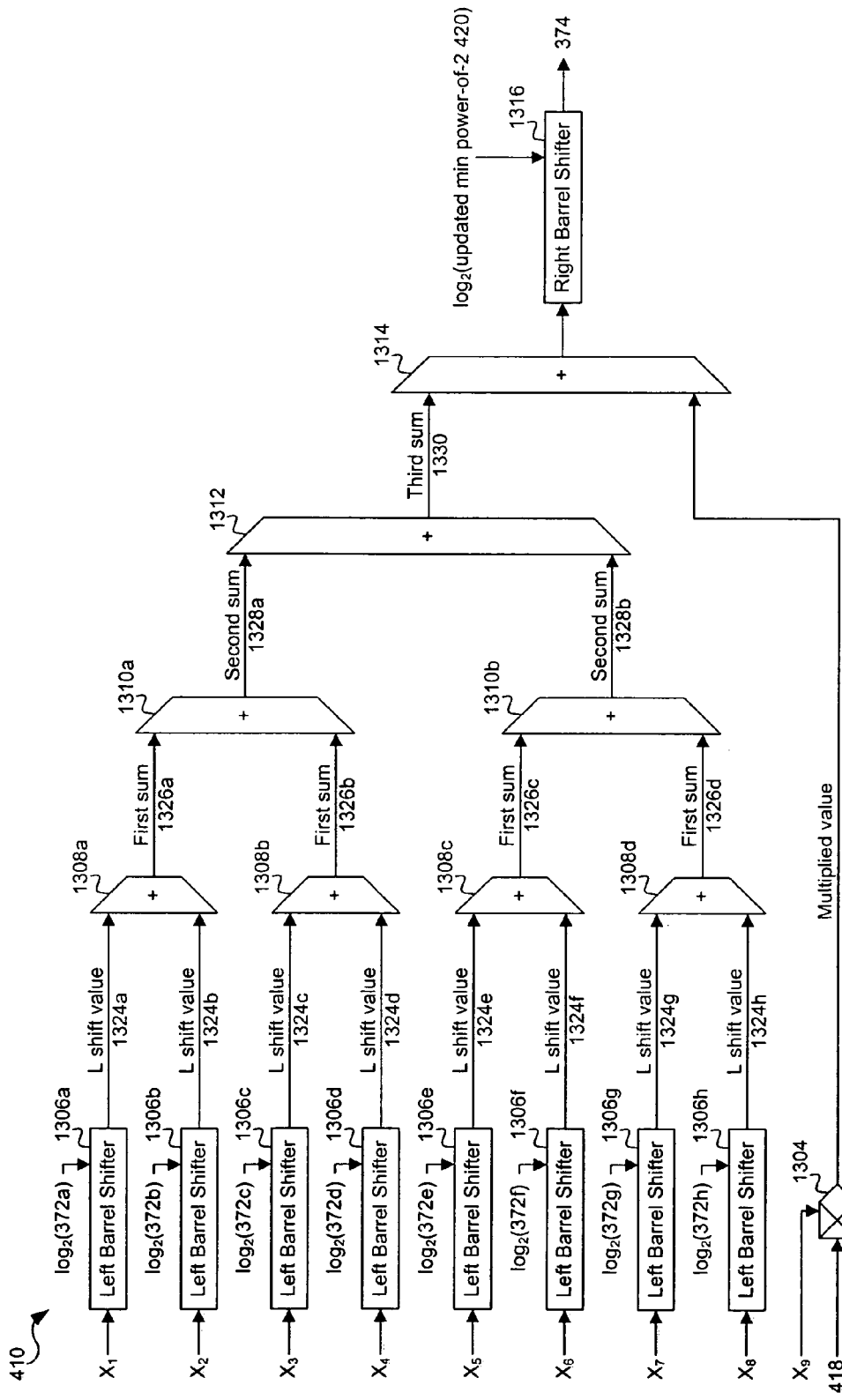

FIG. 13 is a diagram of an example weighted average calculator according to an embodiment of the present invention.

Figure 14:
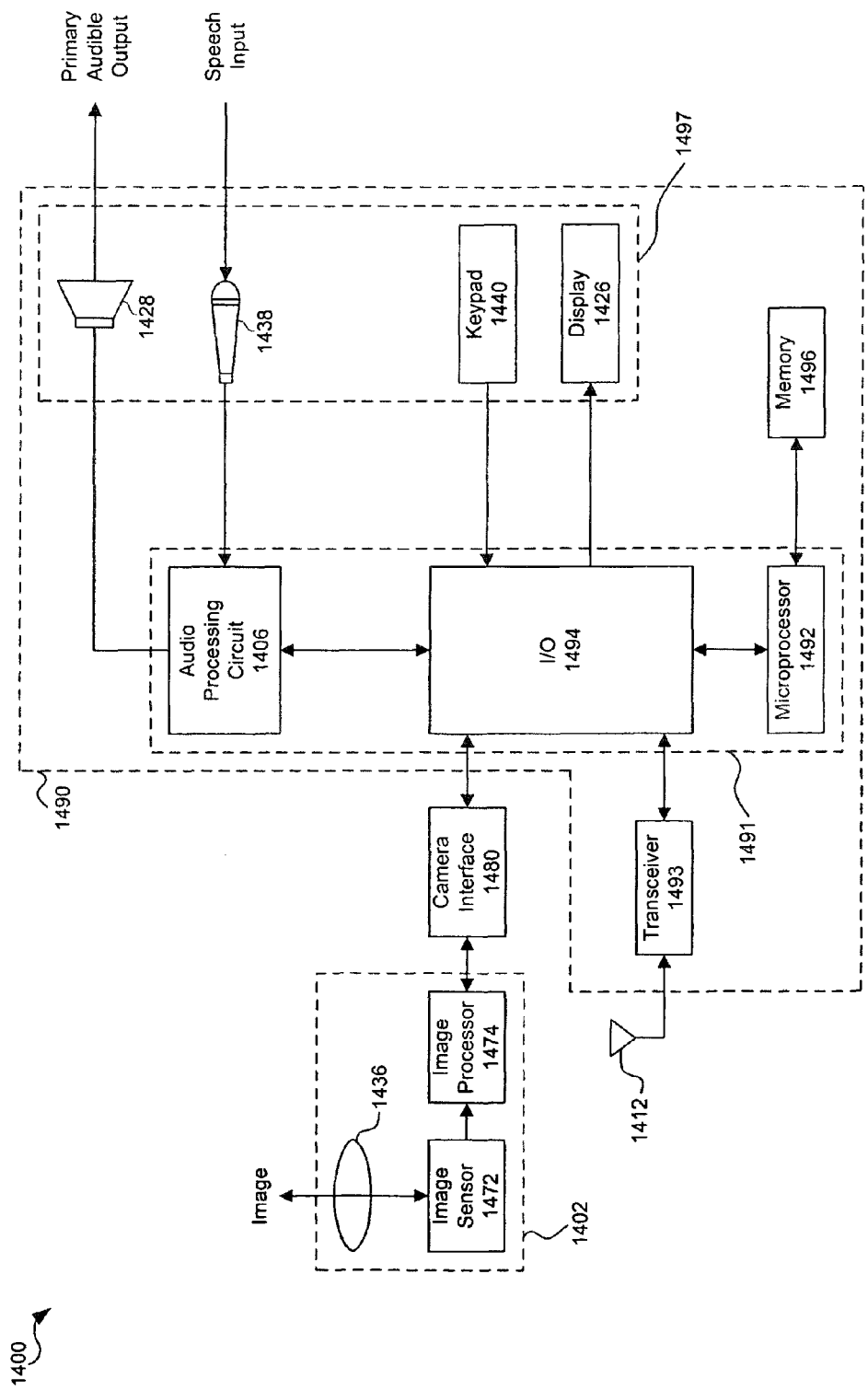

FIG. 14 is a diagram of an example mobile device according to an embodiment of the present invention.

Figure 15:
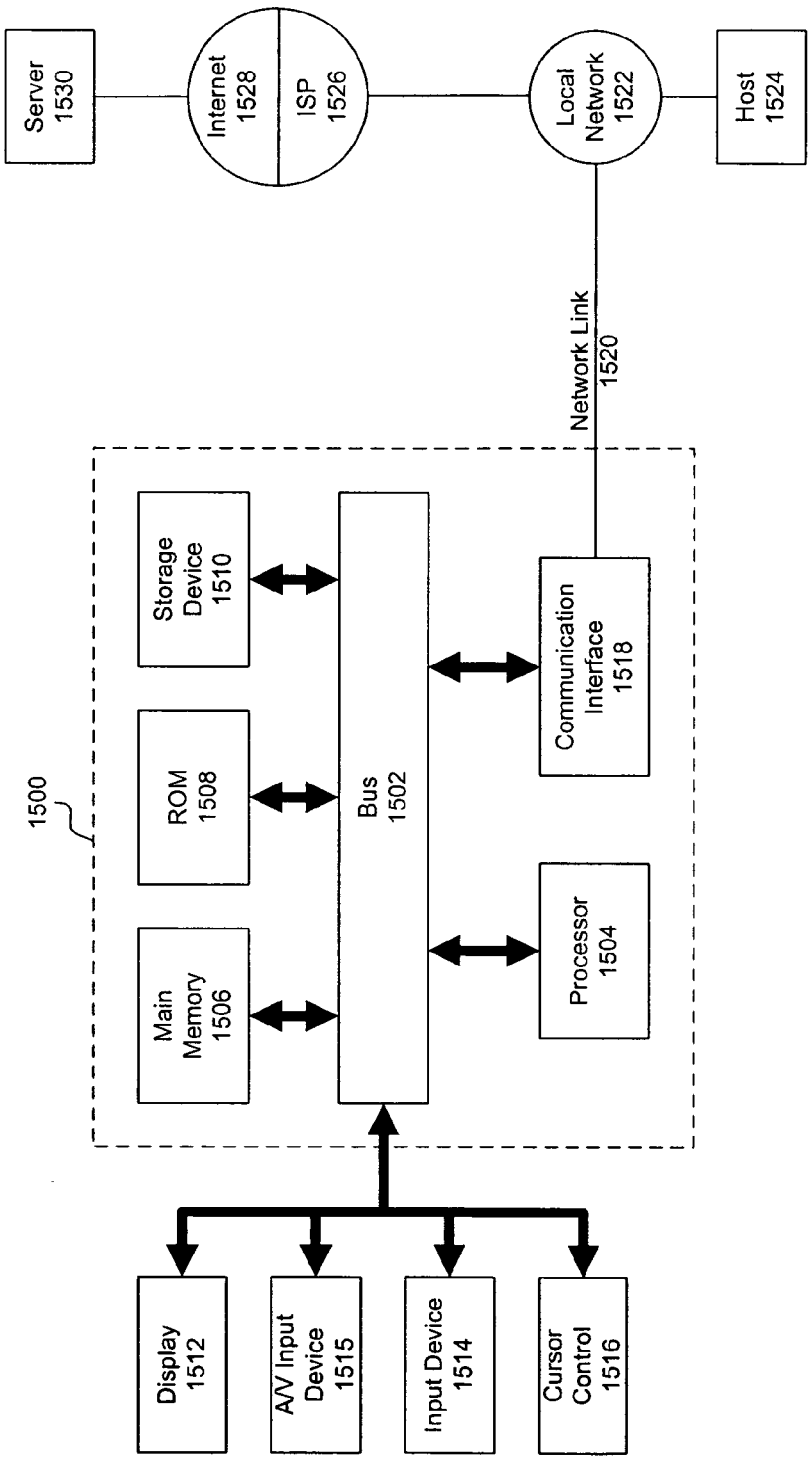

FIG. 15 is a diagram of an example computer system according to an embodiment of the present invention.

Figure 16:
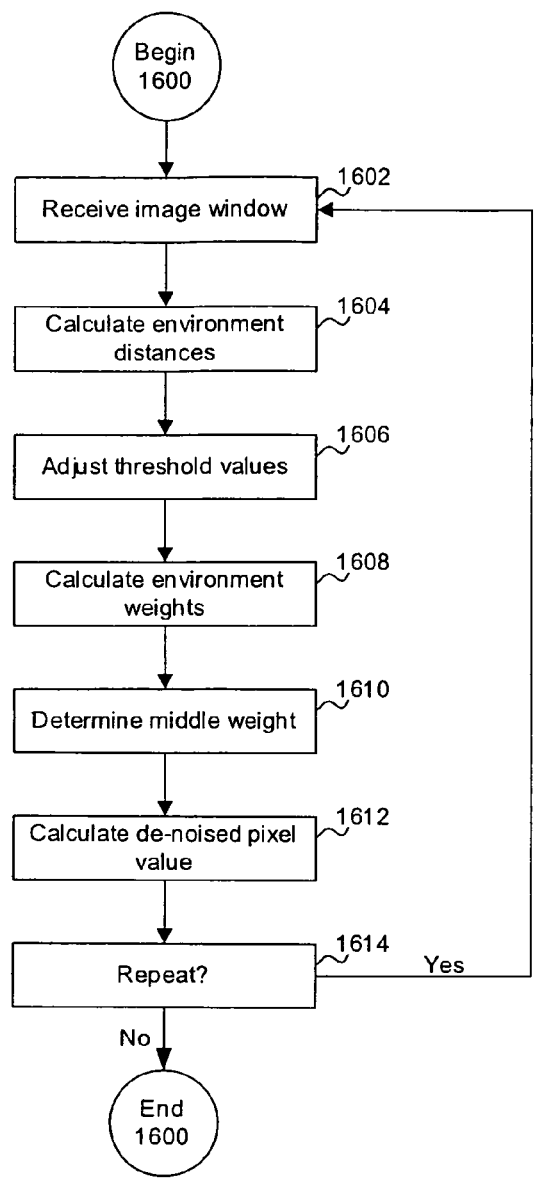

FIG. 16 is a flowchart of a method for reducing noise in an image according to an embodiment of the present invention.

DETAILED DESCRIPTION OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Techniques are disclosed herein for processing signal data. The signal data can be represented by a number of different signal matrices, with each matrix representing a different portion of the signal. For example, each signal matrix is configured to contain entries that correspond to a set of pixels in an image sensor. The signal data may comprise, for example, audio data or other signal data other than image data.

Figure 1:
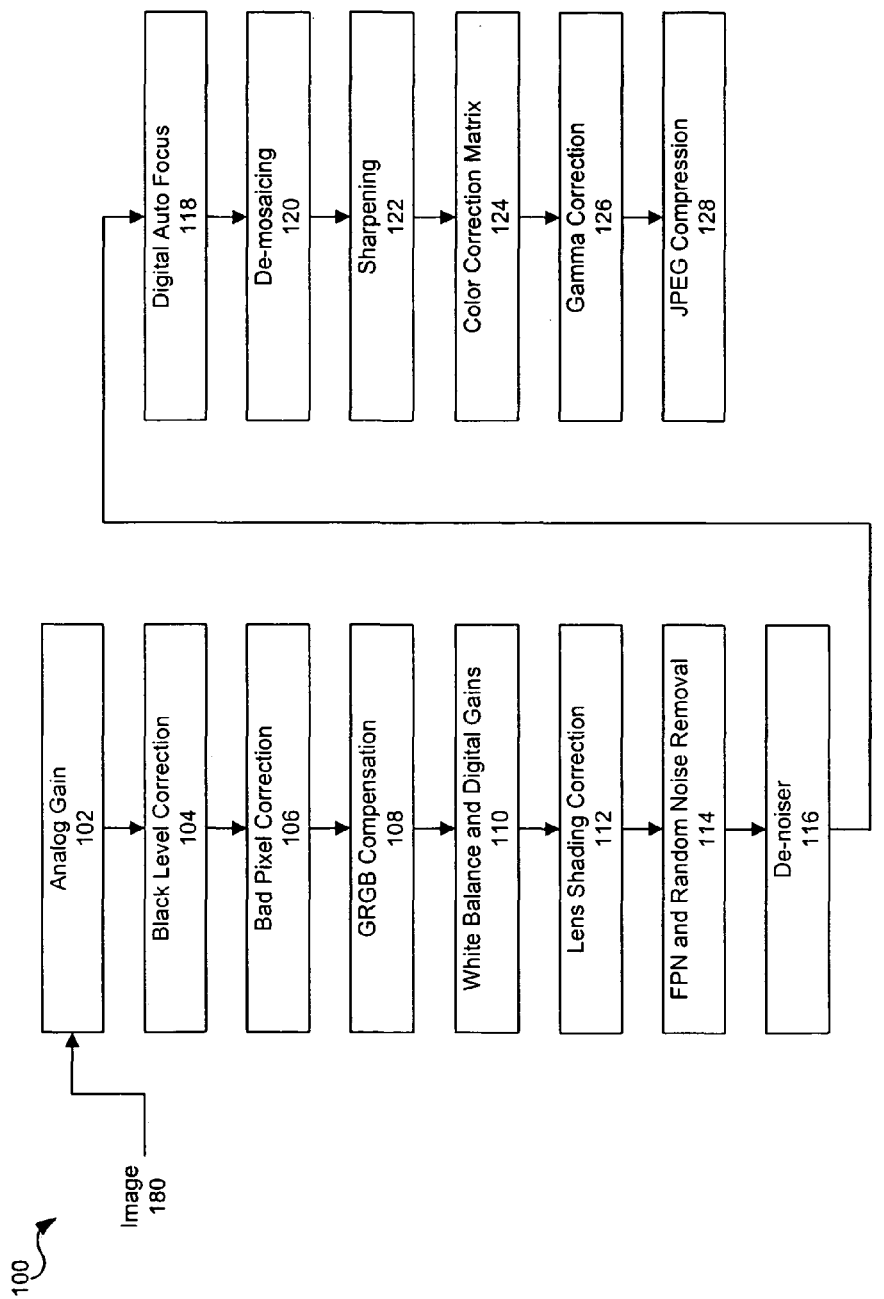
FIG. 1 is a diagram that illustrates an example system suitable for implementing an embodiment of the present invention.

FIG. 1 is a diagram illustrating a system 100 suitable for implementing an embodiment of the present invention. As an example, not to be limiting, system 100 may be an image signal processing (ISP) chain. In an embodiment, ISP chains include modules that run algorithms to process RAW images, outputting final images (e.g., JPEG images, TIFF images, etc.) that are saved in non-volatile memory. As shown in FIG. 1, system 100 includes an analog gain module 102, a black level correction module 104, a bad pixel correction module 106, a green-red/green-blue (GRGB) compensation module 108, a white balance and digital gain module 110, a lens shading correction module 112, a fixed-pattern noise (FPN) and random noise removal module 114, a de-noiser module 116, a digital auto focus module 118, a de-mosaicing module 120, a sharpening module 122, a color correction matrix module 124, a gamma correction module 126, and a JPEG compression module 128. Note that these ISP modules are not required to implement the de-noising algorithm presented in this application.

In an embodiment, analog gain module 102 receives an image 180 from an image sensor, not shown, that detects image 180. In an alternate embodiment, analog gain module 102 receives image 180 from memory coupled to the image sensor that detects image 180. The memory can be flash memory, magnetic disks, optical disks, or other such storage mediums. The image sensor converts an optical image into an electrical signal to create image 180. The image sensor can be one of several different kinds of color image sensors, such as, for example, a BAYER sensor, a Foveon X3 sensor, a 3CCD sensor, etc. A BAYER sensor, for instance, passes red, green, and blue light to pixels, forming an interlaced grid that is sensitive to the three colors. A BAYER sensor can utilize a BAYER filter, which is a specific arrangement of green, red, and blue color filters to cover each pixel. The BAYER filter is described in greater detail below with respect to FIG. 5. For the purposes of clarity, not to be limiting, system 100 is described herein as if the image sensor is a BAYER sensor.

Analog gain module 102 can apply a gain to image 180 to compensate for any dark portions of image 180 that may result while using a low exposure time. Analog gain module 102 applies the gain before an analog-to-digital (A/D) conversion occurs. Analog gain module 102 passes a modified version of image 180 to black level correction module 104.

In an embodiment, black level correction module 104 removes a floor value from image 180. As an example, black level correction module 104 removes from image 180 a "dark current" that is output from the image sensor. Black level correction module 104 passes a further modified version of image 180 to bad pixel correction module 106.

Bad pixel correction module 106 locates "burned" pixels within image 180 that produce very low or very high false values. In an embodiment, bad pixel correction module 106 then replaces those "burned" pixels with a "smart" average of image 180's environment. Bad pixel correction module 106 passes a further modified version of image 180 to GRGB compensation module 108.

In an embodiment, GRGB compensation module 108 compensates for differences that may occur between green pixel values in pixel lines that contain both green and red pixels, and green pixel values in pixel lines that contain both green and blue pixels. As an example, pixel values are 12 bits and represent the intensity of the chosen color. GRGB compensation module 108 passes a further modified version of image 180 to white balance and digital gain module 110.

White balance and digital gain module 110 applies a gain to each green, red, and blue pixel value to balance the colors and compensate for lighting conditions and light levels, while maintaining each pixel's dynamic range. In an embodiment, white balance and digital gain module 110 passes a further modified version of image 180 to lens shading correction module 112.

In an embodiment, lens shading correction module 112 compensates for a lens shading profile by increasing the luminance of pixels placed far from the middle pixel. Lens shading correction module 112 passes a further modified version of image 180 to fixed-pattern noise (FPN) and random noise removal module 114.

FPN and random noise removal module 114 removes random noise and fixed-pattern noise from image 180. In an embodiment, FPN and random noise removal module 114 passes a further modified version of image 180 to de-noiser module 116.

In an embodiment, de-noiser module 116 effectively removes noise from at least a portion of image 180, while preserving pixel values near and on edges and contours, and in detail-rich areas, with as minimal impact as possible on contrast. As used herein, edges and contours refer to those regions in image 180 where an abrupt change in pixel values occurs, regardless of the pixels' spatial location. And as used herein, detail-rich areas refer to pixels of image 180 that lie in close proximity and exhibit varying contrast levels. De-noiser module 116 replace the center or middle pixel of the portion of image 180 that is being processed with an average of other pixels in its vicinity. These neighboring pixels are similar to the middle pixel in value and have similar environments. De-noiser module 116 is described in greater detail below with respect to FIGS. 2-13. De-noiser module 116 passes a further modified version of image 180 to digital auto focus module 118.

Digital auto focus module 118 increases the contrast of image 180. Digital auto focus module 118 is described in greater detail in co-owned U.S. patent application Ser. No. 11/970,427, entitled "Techniques for Adjusting the Effect of Applying Kernels to Signals to Achieve Desired Effect on Signal," filed on Jan. 7, 2008, which is incorporated herein by reference in its entirety. In an embodiment, digital auto focus module 118 passes a further modified version of image 180 to de-mosaicing module 120.

In an alternate embodiment, not shown, de-noiser module 116 is included within digital auto focus module 118. In this case, FPN and random noise removal 114 passes the further modified image 180 to digital auto focus 118.

De-mosaicing module 120 performs an interpolation, such that image 180 becomes a complete RGB image where every pixel has three color channel values. In an embodiment, de-mosaicing module 120 passes a further modified version of image 180 to sharpening module 122.

Sharpening module 122 enhances the contrast of pixels in image 180. In an embodiment, digital auto focus module 118 differs from sharpening module 122 in that digital auto focus module 118 compensates for a point spread function. Sharpening module 122 passes a further modified version of image 180 to color correction matrix module 124.

Color correction matrix module 124 controls the color accuracy and color saturation of image 180. In an embodiment, color correction matrix module 124 passes a further modified version of image 180 to gamma correction module 126.

Gamma correction module 126 applies a gamma curve to image 180. In an embodiment, gamma correction module 126 passes a further modified version of image 180 to JPEG compression module 128.

JPEG compression module 128 compresses image 180 from a full BMP image to a JPEG image that can then be saved to a non-volatile memory, such as, for example, flash memory. Any compression other than JPEG, such as GIF, can also be used to compress image 180.

Each of analog gain module 102, black level correction module 104, bad pixel correction module 106, GRGB compensation module 108, white balance and digital gains module 110, lens shading correction module 112, FPN and random noise removal module 114, de-noiser module 116, digital auto focus module 118, de-mosaicing module 120, sharpening module 122, color correction matrix module 124, gamma correction module 126, and JPEG compression module 128 can be implemented in hardware, software, or any combination thereof.

Figure 2:
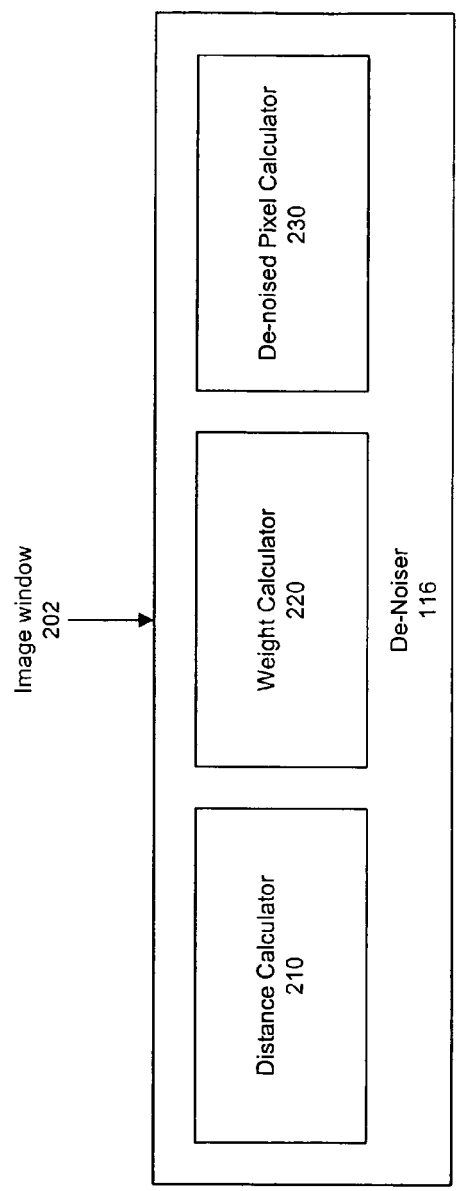
FIG. 2 is a diagram of a module of the example system according to an embodiment of the present invention.

FIG. 2 illustrates a diagram of de-noiser module 116 according to an embodiment of the present invention. As shown in FIG. 2, de-noiser module 116 includes a distance calculator 210, a weight calculator 220, and a de-noised pixel calculator 230. In an embodiment, de-noiser module 116 evaluates a single portion of image 180 at a time, identified as image window 202. For example, image window 202 can be a 7 by 7 matrix of pixels. If de-noiser module 116 is implemented as a standalone module, then seven line buffers are used to store the seven lines of pixels from image window 202 to allow for a pipelined implementation. If de-noiser module 116 is implemented as an addition to digital auto focus module 118, then no additional line buffers are required since digital auto focus module 118 also uses line buffers to store pixels of image 180. As an example, digital auto focus module 118 can have nine reusable line buffers. A more detailed description of image window 202 is given below with respect to FIGS. 5A-B.

In an embodiment, distance calculator 210 calculates a difference in values between a pixel at the center or middle of image window 202 and pixels neighboring the middle pixel. A more detailed description of these pixels is provided below with respect to FIGS. 5A-B. A more detailed description of the difference calculations are provided below with respect FIG. 6.

In an embodiment, weight calculator 220 calculates weights for each pixel that neighbors the middle pixel. The weights are dependent on the differences calculated in distance calculator 210. The weight calculations are described in greater detail below with respect to FIG. 8.

In an embodiment, de-noised pixel calculator 230 uses weights generated by weight calculator 220 to de-noise the middle pixel. De-noised pixel calculator 230 outputs a new pixel value to replace the original middle pixel value. De-noised pixel calculator 230 is described in greater detail below with respect to FIGS. 4 and 9-13.

Note that de-noiser module 116 can process several times, receiving a different image window 202 each time. In an embodiment, de-noiser module 116 processes until each pixel in image 180 has appeared as the middle pixel in image window 202 and has been replaced with a de-noised value. Once all pixels in image 180 have been de-noised and had their values replaced, image 180 is processed by the remaining modules of the ISP chain. In another embodiment, de-noiser module 116 processes until a set number of pixels in image 180 have been de-noised.

Note also that if de-noiser module 116 is incorporated within digital auto focus module 118, then de-noiser module 116 passes the de-noised middle pixel value to the rest of digital auto focus module 118 for further processing of image 180 before another image window 202 is processed.

Figure 3:
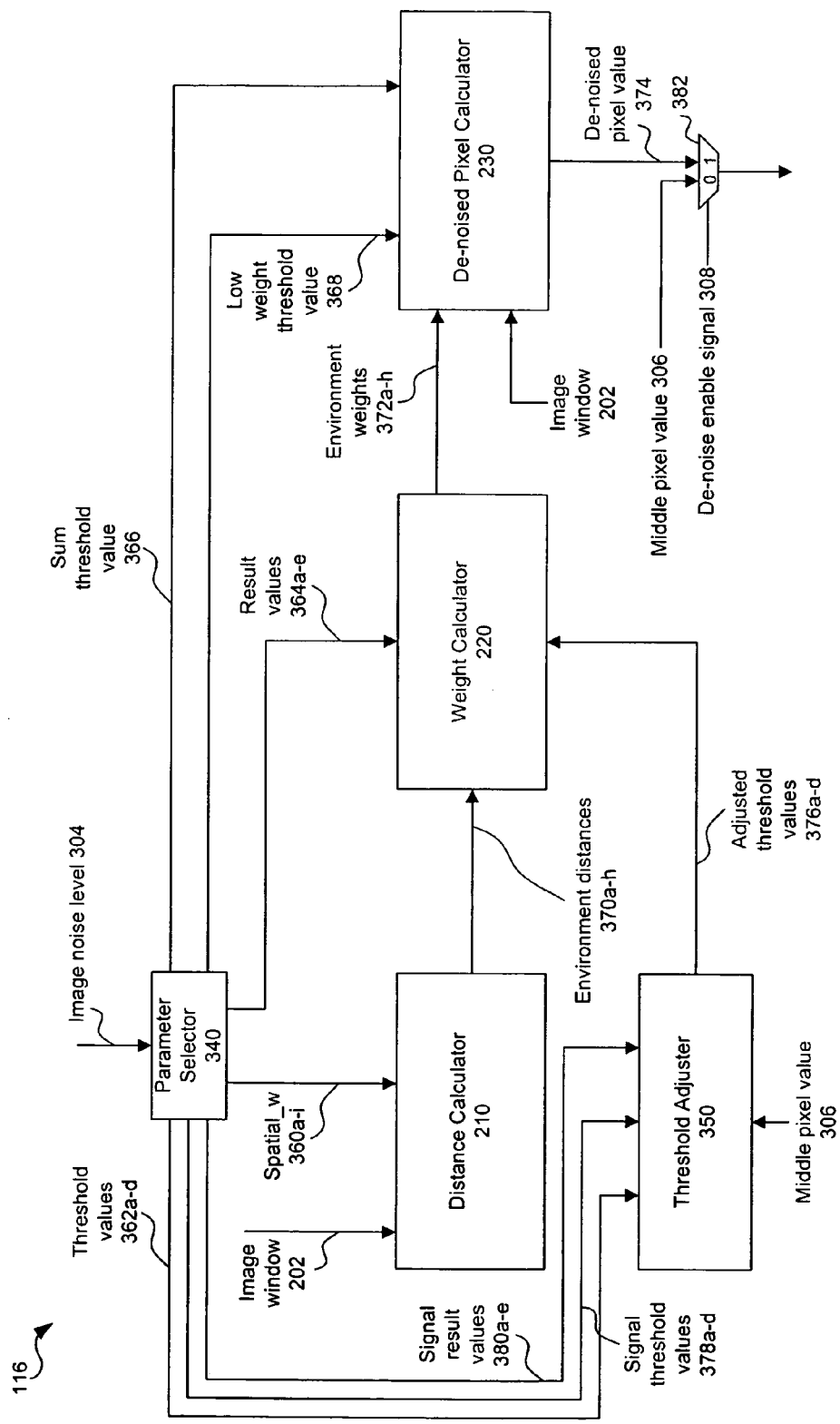
FIG. 3 is a more detailed diagram of the module of the example system according to an embodiment of the present invention.

FIG. 3 is a more detailed diagram of de-noiser module 116 according to an embodiment of the present invention. Specifically, FIG. 3 illustrates components of de-noiser module 116 interacting to generate a de-noised pixel value for each middle pixel. As shown in FIG. 3, in addition to distance calculator 210, weight calculator 220, and de-noised pixel calculator 230, de-noiser module 116 also includes a parameter selector 340 and a threshold adjuster 350. In an embodiment, de-noiser module 116 receives inputs image window 202 and de-noise enable signal 308. De-noise enable signal 308 controls whether de-noiser module 116 is enabled or disabled. De-noise enable signal 308 is received from another module in system 100 or from a source outside of the ISP chain. Example systems including components outside of the ISP chain are described below with respect to FIGS. 14 and 15.

Several signals can be derived from image 180 and image window 202, including, for example, image noise level 304 and middle pixel value 306. Image noise level 304 is a metric that is correlated to the level of noise in image 180. In an embodiment, this metric is calculated in a preceding module of system 100 and input to de-noiser module 116. In another embodiment, image noise level 304 is calculated during a preview mode, where the preview mode does not result in image 180 being saved to non-volatile memory. Alternatively, image noise level 304 is estimated using knowledge of digital and/or analog gains and an exposure time that were applied to image 180. In an embodiment, middle pixel value 306 is a value of the middle pixel in image window 202.

Parameter selector 340 stores several de-noising parameter profiles. In an embodiment, parameter selector 340 uses image noise level 304 to determine which parameter profile to apply to image window 202. As an example, not to be limiting, five parameter profiles are defined, where a first parameter profile is chosen for a very low noise level, a second parameter profile is chosen for a low noise level, a third parameter profile is chosen for a medium noise level, a fourth parameter profile is chosen for a high noise level, and a fifth parameter profile is chosen for a very high noise level.

Each parameter profile defines a number of threshold values and constants used by distance calculator 210, weight calculator 220, and de-noised pixel calculator 230. In an embodiment, parameter selector 340 passes nine constants, spatial_w values 360*a-i*, to distance calculator 210; threshold values 362*a-d*, signal threshold values 378*a-d*, and signal result values 380*a-e* to threshold adjuster 350; result values 364*a-e* to weight calculator 220; and sum threshold value 366 and low weight threshold value 368 to de-noised pixel calculator 230. These threshold values and constants are described in more detail below with respect to FIGS. 6-8 and 12A-B.

In an embodiment, threshold adjuster 350 uses signal threshold values 378a-d, signal result values 380a-e, and middle pixel value 306 to adjust threshold values 362a-d, outputting adjusted threshold values 376a-d. In an alternate embodiment, middle pixel value 306, as well as the values of the middle pixel's neighboring pixels, are used in the adjustment calculation. A more detailed description of threshold adjuster 350 is provided below with respect to FIGS. 7A-B. Threshold adjuster 350 passes adjusted threshold values 376a-d to weight calculator 220.

In an embodiment, distance calculator 210 uses image window 202 and spatial_w values 360a-i to calculate environment distances 370a-h. Distance calculator 210 passes environment distances 370a-h to weight calculator 220.

Weight calculator 220 uses result values 364a-e, environment distances 370a-h, and adjusted threshold values 376a-d to determine environment weights 372a-h. In an embodiment, weight calculator 220 passes environment weights 372a-h to de-noised pixel calculator 230.

In an embodiment, de-noised pixel calculator 230 uses sum threshold value 366, low weight threshold value 368, environment weights 372a-h, and image window 202 to determine a de-noised pixel value 374 for the middle pixel of image window 202. De-noised pixel calculator 230 sends de-noised pixel value 374 to multiplexor 382, which is controlled by de-noise enable signal 308. If de-noiser module 116 is a standalone module and enabled, multiplexor 382 passes de-noised pixel value 374 through. Otherwise, if de-noiser module 116 is a standalone module and disabled, the original pixel value, middle pixel value 306 is passed through. If de-noiser module 116 is a standalone module, multiplexor 382 controls whether a full de-noised pixel image or image 180 passes through instead of a single pixel.

Figure 4:
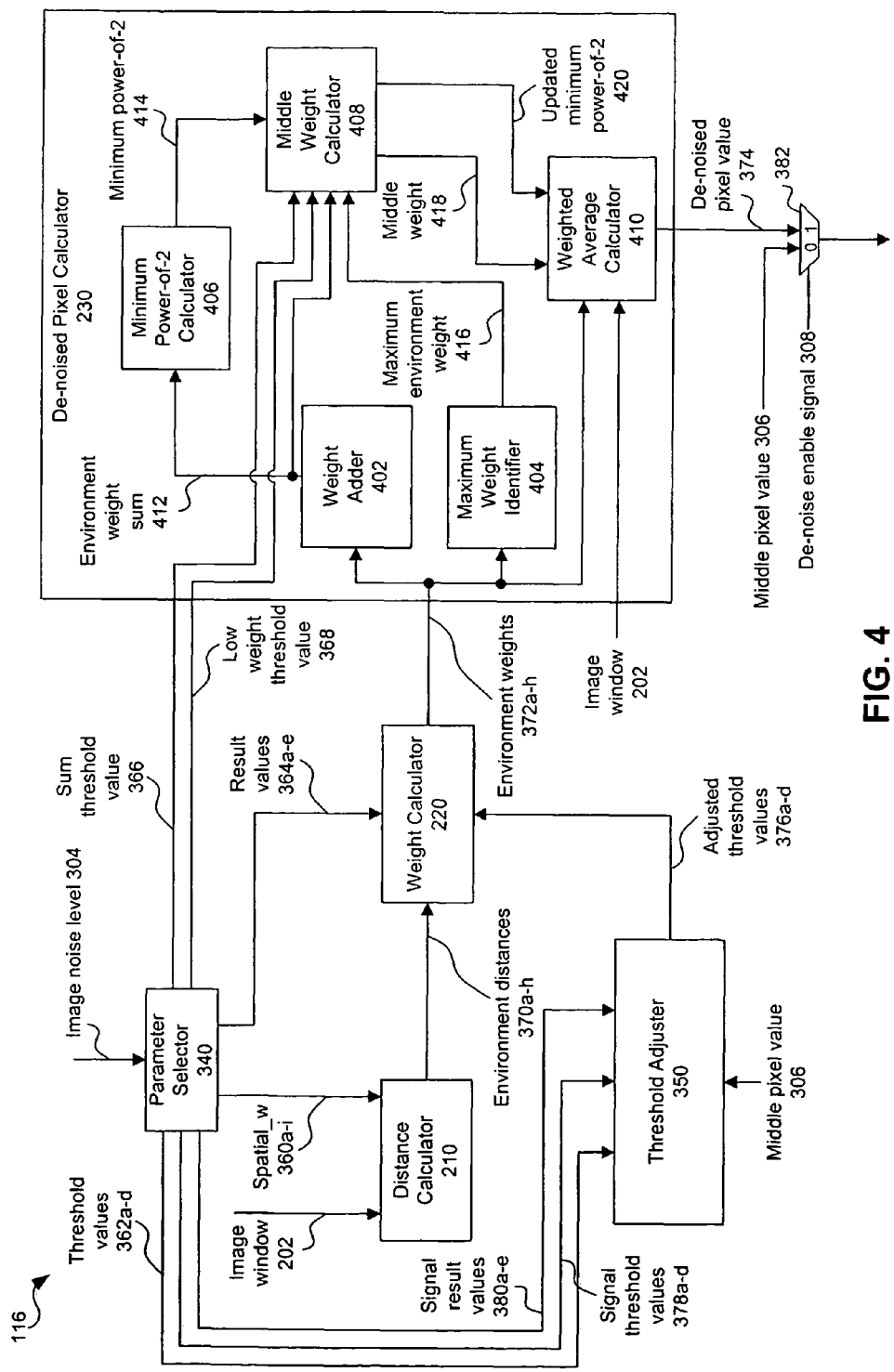
FIG. 4 is a detailed diagram of a component of the module of the example system according to an embodiment of the present invention.

FIG. 4 is a detailed diagram of de-noised pixel calculator 230 according to an embodiment of the present invention. As shown in FIG. 4, de-noised pixel calculator 230 includes a weight adder 402, a maximum weight identifier 404, a minimum power-of-2 calculator 406, a middle weight calculator 408, and a weighted average calculator 410. In an embodiment, weight adder 402 takes environment weights 372a-h and finds their sum. Weight adder 402 sends this sum in the form of environment weight sum 412 to minimum power-of-2 calculator 406 and middle weight calculator 408. Weight adder 402 is described in greater detail below with respect to FIG. 9.

Maximum weight identifier 404 receives environment weights 372a-h and identify the largest environment weight. In an embodiment, maximum weight identifier 404 passes its result to middle weight calculator 408. Maximum weight identifier 404 is described in greater detail below with respect to FIG. 10.

In an embodiment, minimum power-of-2 calculator 406 calculates the smallest power-of-2 that is larger than environment weight sum 412. The result, minimum power-of-2 414, is forwarded to middle weight calculator 408. Minimum power-of-2 calculator 406 is described in greater detail below with respect to FIG. 11.

Middle weight calculator 408 adjusts minimum power-of-2 414 according to several conditions to ensure a weight of the middle pixel is not too small. Middle weight calculator 408 also calculates the weight of the middle pixel. In an embodiment, both calculations are dependent on sum threshold value 366, low weight threshold value 368, environment weight sum 412, minimum power-of-2 414, and maximum environment weight 416. A middle weight 418 and an updated minimum power-of-2 420 is sent to weight average calculator 410. A more detailed description of middle weight calculator 408 is provided below with respect to FIGS. 12A-B.

In an embodiment, weighted average calculator 410 uses environment weights 372a-h, image window 202, middle weight 418, and updated minimum power-of-2 420 to calculate de-noised pixel value 374, which replaces the original middle pixel value. Weighted average calculator 410 is described in greater detail below with respect to FIG. 13.

FIGS. 5A-B display an example image window 202 according to an embodiment of the present invention. As shown in FIG. 5A, image window 202 consists of seven lines, lines 502, 504, 506, 508, 510, 512, and 514, totaling 49 pixels. In an embodiment, a minimum size for image window 202 is a 7 by 7 matrix. The pixel identified by $X_9$ is also known as the middle or center pixel of image window 202. Pixels $X_1$, $X_2$, $X_3$, $X_4$, $X_5$, $X_6$, $X_7$, and $X_8$ are those pixels that neighbor the middle pixel and are used in determining the eventual de-noised middle pixel value.

In an embodiment, an environment is defined around each pixel that is used to determine the de-noised pixel value and defined around the middle pixel. Each environment is a 3 by 3 matrix of pixels. For example, the environment of $X_1$ comprises pixels $E_{1\_11}$, $E_{1\_21}$, $E_{1\_31}$, $E_{1\_12}$, $E_{1\_13}$, $E_{1\_33}$, and $X_1$. Image window 202 can comprise nine environments. Note that the environments overlap as there are several pixels that are common to two or more environments. As an example, the third pixel in line 506, from left to right, is common to the environments of $X_1$, $X_2$, $X_4$, and $X_9$.

As shown in FIG. 5B, each pixel in image window 202 represents a single color. In this case, each pixel is either red (R), green (G), or blue (B). According to the BAYER pattern, each line comprises either alternating red and green pixels or alternating blue and green pixels. $X_1$ through $X_9$ are all the same color, in this case blue. This property holds true no matter which color is represented by $X_I$ through $X_9$. Also, a color at a given location in one environment corresponds to the same color at the same relative location in another environment. For example, the third pixel in line 506, from left to right, is red and corresponds to the bottom right corner of the environment of $X_1$. Likewise, the fifth pixel in line 510, from left to right, also is red and also corresponds to the bottom right corner of an environment, in this case $X_9$'s environment. As is described below, this property is important for the difference calculations of distance calculator 210.

FIGS. 6-13 illustrate hardware diagrams of de-noiser module 116 and reference those pixels of image window 202 displayed in FIGS. 5A-B. In an embodiment, the following hardware implementations are designed in a way that minimizes the required gate count. However, this is not meant to be limiting, as other hardware implementations can be used to carry out the present invention.

FIG. 6 is a detailed diagram of distance calculator 210 according to an embodiment of the present invention. As shown in FIG. 6, distance calculator 210 includes at least subtractor blocks 602a-i, absolute value blocks 604a-i, barrel shifters 606a-i, and adder blocks 608a-d, 610a-b, 612, and 614. In an embodiment, the components shown in FIG. 6 are used to calculate one of environment distances 370a-h. An additional seven identical blocks can be present in distance calculator 210 to calculate environment distances 370a-h in parallel. In an alternate embodiment, not shown, each environment distance 370a-h is calculated serially, such that the components shown in FIG. 6 calculate each environment distance 370a-h one at a time. As described herein, it is assumed the components shown in FIG. 6 calculate environment distance 370a.

Environment distances 370a-h are calculated by subtracting the pixel values of the environment of the middle pixel from pixel values of one of the environments of a pixel neighboring the middle pixel. In an embodiment, the components shown in FIG. 6 physically represent the following formula used to determine environment distances 370a-h:

$$D_k = \sum_{i=1}^{3}\sum_{j=1}^{3} \text{Spatial\_W}[i, j] * |E_k[i, j] - E_9[i, j]| \quad (1)$$

where $D_k$ refers to one of the eight environment distances 370a-h, Spatial_W[i, j] refers to one of the nine spatial_w values 360a-i, $E_k$ refers to a pixel value in the environment of $X_k$, k runs from one to eight, and i and j determine the position within a 3 by 3 pixel matrix. Note that an absolute value of the difference is taken to ensure no environment distance 370a-h is negative.

In an embodiment, spatial_w values 360a-i function as weights used to apply varying degrees of importance to pixels based on their location within the environment. Spatial_w values 360a-i are organized as 3 by 3 pixel matrices. In an embodiment, each spatial_w value 360a-i is a power-of-2 and a base two logarithm of each spatial_w value 360a-i is stored in a register (not shown) coupled to each respective barrel shifter 606a-i. This allows barrel shifters 606a-i to function as multipliers or dividers, where the absolute value of the difference between $E_{9\_xy}$ and $E_{1\_xy}$ is bit shifted to the right if the corresponding spatial_w value 360a-i is less than one, and bit shifted to the left if the corresponding spatial_w value 360a-i is greater than one.

The sum of spatial_w values 360a-i corresponds to the dynamic range of environment distances 370a-h. For example, if spatial_w values 360a-i sum to one, then environment distances 370a-h have a dynamic range of one, meaning environment distances 370a-h are of the same bit resolution as the pixel values of image window 202. If spatial_w values 360a-i sum to 16, then environment distances 370a-h have a dynamic range 16 times greater than when the sum is one. While a smaller dynamic range is preferred, since it requires fewer bits to represent environment distances 370a-h and reduces the gate count, there is no restriction on the sums or dynamic range. Note that it is possible to decrease the dynamic range, while maintaining weights that are powers-of-2, by multiplying spatial_w values 360a-i by ½, ¼, etc. Table 1 below gives four examples of possible spatial_w values 360a-i.

TABLE 1

| | 1 | 2 | 3 | 1 | 2 | 3 | 1 | 2 | 3 | 1 | 2 | 3 |
|---|---|---|---|---|---|---|---|---|---|---|---|---|
| 1 | 1/16 | 1/8 | 1/16 | 1/16 | 1/16 | 1/16 | 2 | 1 | 2 | 3 | 2 | 3 |
| 2 | 1/8 | 1/4 | 1/8 | 1/16 | 1/2 | 1/16 | 1 | 4 | 1 | 2 | 5 | 2 |
| 3 | 1/16 | 1/8 | 1/16 | 1/16 | 1/16 | 1/16 | 2 | 1 | 2 | 3 | 2 | 3 |

In an alternate embodiment, as shown in the right-most example of Table 1, spatial_w values 360a-i are not powers-of-2. This can require implementing the multiplication of weights by the absolute values, as shown in Equation (1), in a more complex way. For example, multipliers and/or adders can be used along with barrel shifters 606a-i to carry out the multiplication. Overall, spatial_w values 360a-i are adjusted as necessary to achieve a desired level of de-noising.

Note that while Equation (1) describes finding differences in pixel values, environment distances 370a-h are dubbed "distances" since they represent how close each environment of those pixels neighboring the middle pixel, $X_1$ through $X_8$, are to the environment of the middle pixel. If, for example, the environments of $X_3$ and $X_9$ are almost identical in terms of pixels values, then environment distance 370c, or $D_3$, receives a very low value. However, if the opposite is true, then environment distance 370c receives a very high value.

As an example, not to be limiting, the pixel values, $E_{k\_xy}$, extend up to 12 bits, resulting in at most a 12 bit value reaching barrel shifters 606a-i. Those values stored in the registers coupled to barrel shifters 606a-i are up to three bits, meaning the absolute values are shifted to the right or left up to 7 bits. The bit resolution of shift values 624a-i is dependent on the bit resolution of the absolute values received by barrel shifters 606a-i, in this case 12 bits. Each sum value that follows an adder, first sums 626a-d, second sums 628a-b, third sum 630, and environment distance 370a, has a maximum bit resolution that is one bit higher than the maximum bit resolution of the two values added together. Therefore, in this case, the maximum bit resolution of first sums 626a-d is 13 bits, the maximum bit resolution of second sums 628a-b is 14 bits, the maximum bit resolution of third sum 630 is 15 bits, and the maximum bit resolution of environment distance 370a is 16 bits.

Once environment distances 370a-h have been calculated, environment weights 372a-h are calculated by weight calculator 220. In an embodiment, environment weights 372a-h is computed by comparing environment distances 370a-h with threshold values. However, prior to these comparisons, the threshold values can be adjusted.

FIGS. 7A-B illustrate more detailed diagrams of threshold adjuster 350 according to an embodiment of the present invention. As shown in FIGS. 7A-B, threshold adjuster 350 includes comparators 702a-d, multiplexor logic 704, and right barrel shifters 750a-d. As shown in FIG. 7A, a signal level of image window 202 are used to determine the proper adjustments. This signal level is input a of comparators 702a-d. In a first embodiment, this signal level is middle pixel value 306. In a second embodiment, not shown, this signal level is a weighted average of $X_1$ through $X_9$. As an example, the following equation is used to calculate the signal level in this embodiment:

$$\text{Signal Level} = \frac{1}{\sum_{i=1}^{9} W_i} \sum_{i=1}^{9} W_i X_i \quad (2)$$

where $W_i$ is a power-of-2. The sum of $W_i$ is normalized to a nearest power-of-2 if it is not originally a power-of-2 to avoid divisions. In a third embodiment, not shown, this signal level is a found according to the following equation:

$$\text{Signal Level} = \frac{1}{8}(X_2 + X_4 + X_5 + X_7 + 4X_9) \quad (3)$$

In a fourth embodiment, not shown, this signal level is found according to the following equation:

$$\text{Signal Level} = \frac{1}{16}(X_1 + X_2 + X_3 + X_4 + X_5 + X_6 + X_7 + X_8 + 8X_9) \quad (4)$$

Once the signal level is determined, it is compared with each signal threshold value 378a-d. Again, as described above, these signal threshold values 378a-d originate based on image noise level 304. As an example, signal threshold values 378a-d are 150, 300, 500, and 800, respectively, for ten bit pixel values. Comparators 702a-d determine whether the signal level is larger than the respective signal threshold value 378a-d and send their respective comparator results 708a-d to multiplexor logic 704. In an embodiment, comparator results 708a-d are one bit values and function as an address that is used to determine signal level factor 710. For example, if the signal level is larger than signal threshold values 378a-b, but not signal threshold values 378c-d, then the address is 1100. In this case, signal result value 380c is used as signal level factor 710. It follows that one of signal result values 380a-e becomes signal level factor 710. As an example, signal result values 380a-e are sixteen, eight, four, two, and one, respectively, for 10 bit pixel values. Note that signal result values 380a-e are inversely proportional to the signal level. In an embodiment, signal result values 380a-e have a maximum bit resolution of eight. The following equation is used to calculate signal level factor 710:

$$\text{Signal Level Factor} = \begin{cases} SRV_a & \text{if} \quad 0 \le \text{Signal Level} \le STV_a \\ SRV_b & \text{if} \quad STV_a \le \text{Signal Level} \le STV_b \\ SRV_c & \text{if} \quad STV_b \le \text{Signal Level} \le STV_c \\ SRV_d & \text{if} \quad STV_c \le \text{Signal Level} \le STV_d \\ SRV_e & \text{if} \quad STV_d \le \text{Signal Level} \le MAX \end{cases} \quad (5)$$

where SRVa-e refer to signal result values 380a-e, respectively, STVa-d refer to signal threshold values 378a-d, and MAX is one less than a value determined by the maximum bit resolution of the signal level.

As shown in FIG. 7B, signal level factor 710 is used to scale threshold values 362a-d. In an embodiment, if threshold values 362a-d and signal level factor 710 are powers-of-2, then right barrel shifters 750a-d are sufficient to properly divide threshold values 362a-d by signal level factor 710. In this case, threshold values 362a-d are bit shifted to the right by a base two logarithm of signal level factor 710 to produce adjusted threshold values 376a-d. In an alternate embodiment, if threshold values 362a-d and/or signal level factor 710 are not powers-of-2, then additional hardware, such as, for example, adders and multipliers, is necessary to carry out the division. The following equation is represented by the components of FIG. 7B:

$$\text{Adjusted Threshold Values} = \frac{\text{Threshold Values}}{\text{Signal Level Factor}} \quad (6)$$

After being calculated, adjusted threshold values 376a-d are sent to weight calculator 220.

FIG. 8 is a more detailed diagram of weight calculator 220 according to an embodiment of the present invention. As shown in FIG. 8, weight calculator 220 includes comparators 802a-d and multiplexor logic 804. In an embodiment, the components shown in FIG. 8 are used to calculate one of environment weights 372a-h. An additional seven identical blocks are present in weight calculator 220 to calculate all environment weights 372a-h in parallel. In an alternate embodiment, not shown, each environment weight 372a-h is calculated serially, such that the components shown in FIG. 8 calculate each environment weight 372a-h one at a time. As described herein, it is assumed the components shown in FIG. 8 calculate environment weight 372a.

In an embodiment, comparators 802a-d determine whether adjusted threshold values 376a-d are larger than environment distance 370a and their comparator results 808a-d to multiplexor logic 804. Note that environment distance 370a corresponds to environment weight 372a, environment distance 370b corresponds to environment weight 372b, and so on. Comparator results 808a-d are one bit values and function as an address that is used to determine environment weight 372a. For example, if environment distance 370a is larger than adjusted threshold value 376a, but not adjusted threshold values 376b-d, then the address is 1000. In this case, result value 364b is used as environment weight 372a. It follows that one of result values 364a-e becomes environment weight 372a. As an example, result values 364a-e are 32, 16, eight, two, and one, respectively. Note that having power-of-2 result values 364a-e lowers the gate count as extra hardware is not necessary for future multiplications. Note also that result values 364a-e are in descending order since small environment distances 370a-h represent closer environments in a distance-metric sense. It follows that environment weights 372a-h should be inversely proportional to environment distances 370a-h so that environments far from the middle pixel's environment in a distance-metric sense have a smaller effect on de-noised pixel value 374. In an embodiment, result values 364a-e have a maximum bit resolution of eight and are stored in registers. The following equation is used to calculate environment weight 372a:

$$\text{Weight} = \begin{cases} RV_a & \text{if} \quad 0 \le Dist \le ATV_a \\ RV_b & \text{if} \quad ATV_a \le Dist \le ATV_b \\ RV_c & \text{if} \quad ATV_b \le Dist \le ATV_c \\ RV_d & \text{if} \quad ATV_c \le Dist \le ATV_d \\ RV_e & \text{if} \quad ATV_d \le Dist \le MAX \end{cases} \quad (7)$$

where $RV_{a-e}$ refer to result values 364a-e, respectively, $ATV_{a-d}$ refer to adjusted threshold values 376a-d, and MAX is one less than a value determined by the maximum bit resolution of environment distances 370a-h. As an example, for spatial_w values 360a-i that sum to one and a pixel value bit resolution of 12 bits, MAX is 4095. Note Equation (7) applies to the calculation for any environment weight 372a-h.

Note that the structure shown in FIG. 8 is similar to the structure shown in FIG. 7A. In an embodiment, not shown, weight calculator 220 and threshold adjuster 350 share the same structure to complete their respective tasks.

In an alternate embodiment, not shown, environment weights 372a-h are calculated using more complex equations. As examples, the following five equations can be used to create inverse relationships between environment distances 370a-h and environment weights 372a-h:

$$W_k = e^{-\frac{D_k}{\sigma}} \quad (8)$$

$$W_k = e^{-\left(\frac{D_k}{\sigma}\right)^2} \quad (9)$$

-continued $$W_k = 2^{-\left(\frac{D_k}{\sigma}\right)} \tag{10}$$

$$W_k = 2^{-\left(\frac{D_k}{\sigma}\right)^2} \tag{11}$$

$$W_k = \frac{a}{D_k} \tag{12}$$

where σ and a are some constants, and k goes from one to eight to cover each environment weight 372a-h and environment distance 370a-h pair. Note that Equations (8)-(12) require a larger gate count than the design of FIG. 8 in implementation.

Once the environment weights 372a-h have been determined, a process to find de-noised pixel value 374 is initiated. FIGS. 9-13 present more detailed diagrams of de-noised pixel calculator 230 and illustrate how finding de-noised pixel value 374 is accomplished. However, the weight of middle pixel value 306, middle weight 418, is required prior to finding de-noised pixel value 374. In a first embodiment, middle weight 418 is a value based on the sum of environment weights 372a-h, environment weight sum 412. In this embodiment, environment weight sum 412 is calculated by weight adder 402.

FIG. 9 is a more detailed diagram of weight adder 402 according to an embodiment of the present invention. As shown in FIG. 9, weight adder 402 includes adders 902a-d, 904a-b, and 906. Adders 902a-d receive environment weights 372a-h, summing two environment weights 372a-h at a time to produce first sums 910a-d. As an example, environment weights 372a-h have a maximum bit resolution of eight bits, meaning first sums 910a-d have a maximum bit resolution of nine bits. Adders 904a-b sum first sums 910a-d two at a time to produce second sums 912a-b. In an embodiment, second sums 912a-b have a maximum bit resolution of 10 bits. Finally, adder 906 sums second sums 912a-b to produce environment weight sum 412, which has a maximum bit resolution of 11 bits. In an embodiment, environment weight sum 412 is sent to both minimum power-of-2 calculator 406 and middle weight calculator 408. The calculation used to find environment weight sum 412 is represented by the following equation:

$$\text{Weight Sum} = \sum_{k=1}^{8} W_k \tag{13}$$

where $W_k$ represents one of environment weights 372a-h.

At a same or different time, maximum weight identifier 404 calculates maximum environment weight 416. FIG. 10 is a more detailed diagram of maximum weight identifier 404 according to an embodiment of the present invention. As shown in FIG. 10, maximum weight identifier 404 includes comparators 1002a-d, 1004a-b, and 1006. Comparators 1002a-d each receive a pair of environment weights 372a-h and determine which environment weight 372a-h in the pair is larger. Comparators 1002a-d pass through the larger environment weight 372a-h to comparators 1004a-b as first largest 1010a-d. Comparators 1004a-b then each determine which first largest 1010a-d is larger, and pass their results to comparator 1006 as second largest 1012a-b. Comparator 1006 then determines which second largest 1012a-b is larger, resulting in maximum environment weight 416. Note that first largest 1010a-d, second largest 1012a-b, and maximum environment weight 416 have the same maximum bit resolution as environment weights 372a-h. In an embodiment, maximum environment weight 416 is sent to middle weight calculator 408. The calculation used to find maximum environment weight 416 is represented by the following equation:

$$\text{Max Weight} = \max_{k} \{W_k\}_{k=1}^{8} \tag{15}$$

where $W_k$ represents one of environment weights 372a-h.

In order to minimize the gate count, minimum power-of-2 414 is calculated by minimum power-of-2 calculator 406 before middle weight 418 is determined. FIG. 11 is a more detailed diagram of minimum power-of-2 calculator 406 according to an embodiment of the present invention. As shown FIG. 11, minimum power-of-2 calculator 406 includes right barrel shifters 1102a-k, comparators 1104a-k, inverters 1106a-k, and adder 1108. In an embodiment, environment weight sum 412 is received by each right barrel shifter 1102a-k and bit shifted to the right by the indicated number to produce shift values 1110a-k. For example, shift value 1110c is equivalent to environment weight sum 412 bit shifted to the right by two bits. If a maximum bit resolution of environment weight sum 412 is 11 bits, then a maximum bit resolution of shift value 1110a is 11 bits, a maximum bit resolution of shift value 1110b is 10 bits, a maximum bit resolution of shift value 1110c is nine bits, and so on.

Each shift value 1110a-k is checked to see if it equals zero by comparators 1104a-k, resulting in one bit results 1112a-k. In an embodiment, results 1112a-k are high if the respective shift value 1110a-k equals zero, and are low if not. These results 1112a-k is inverted by inverters 1106a-k and aggregated together to form inverted results 1114. As an example, inverted results 1114 is 11 bits, with an inverted result 1112a functioning as the least significant bit and an inverted result 1112k functioning as the most significant bit.

Finally, adder 1108 adds one to inverted results 1114, resulting in an 11 bit minimum power-of-2 414. Note FIG. 11 is not meant to be limiting, as any viable schematic design is used to find minimum power-of-2 414. As an example, a more complicated design uses a base two logarithm of environment weight sum 412 to determine minimum power-of-2 414. In this case, a calculation of minimum power-of-2 414 is represented by the following equation:

$$MP2 = 2^{ceil(\log 2(weight\ sum))} \tag{16}$$

where ceil rounds the result of the base two logarithm to the nearest integer. In an embodiment, minimum power-of-2 414 is sent to middle weight calculator 408. With minimum power-of-2 414, middle weight calculator 408 computes middle weight 418.

FIGS. 12A-B are more detailed diagrams of middle weight calculator 408 according to an embodiment of the present invention. As shown in FIGS. 12A-B, middle weight calculator 408 includes comparators 1202 and 1214, multiplexor logic 1204 and 1218, left barrel shifter 1210, subtractors 1212 and 1220, and left barrel shifter 1222. Before outputting middle weight 418 and a possible updated minimum power-of-2 420, middle weight calculator 408 checks several end cases to ensure de-noised pixel value 374 is eventually calculated correctly.

FIG. 12A illustrates a first condition used to check an end case. Comparator 1202 compares minimum power-of-2 with sum threshold value 366 to determine which is larger, outputting comparator result 1206 to multiplexor logic 1204. In an embodiment, comparator result 1206 is a one bit value that functions as an address used to identify which data input becomes a intermediate minimum power-of-2 1208. In this case, minimum power-of-2 414 and sum threshold value 366 also function as data inputs to multiplexor logic 1204. As an example, if minimum power-of-2 414 is larger than sum threshold value 366, then comparator result 1206 is low, resulting in minimum power-of-2 414 becoming intermediate minimum power-of-2 1208. Essentially, intermediate minimum power-of-2 1208 becomes the larger of the two multiplexor logic 1204 data inputs. In an embodiment, both minimum power-of-2 414 and sum threshold value 366 have a maximum bit resolution of 11 bits, meaning intermediate minimum power-of-2 1208 also has a maximum bit resolution of 11 bits.

The purpose of the first condition is to treat an end case where each environment weight 372a-h receives a very low value, such as, for example, one or two, resulting in a low environment weight sum 412. A low environment weight sum 412 eventually leads to a low middle weight 418, as described below, such that the relative percentage of environment weights 372a-h to a weighted average of environment weights 372a-h and middle weight 418 is high. In an embodiment, a low relative percentage of environment weights 372a-h to the weighted average of environment weights 372a-h and middle weight 418 is actually desired. For example, if environment weights 372a-h receive the values of zero, zero, zero, zero, zero, one, one, and one, respectively, environment weight sum 412 is three, and minimum power-of-2 414 is four, then middle weight 418 is one, according to Equation (18) below, and is thus only ¼ of the total weighted average. On the other hand, the other pixels $X_1$ through $X_8$ receive a ¾ share even though it is not desirable to give such weight to these pixels considering the low environment weights 372a-h indicate their environments are not close to the middle pixel's environment. As an example, sum threshold value 366 is 16. As is shown below, this results in middle weight 418 being ¹³⁄₁₆ of the total weighted average.

FIG. 12B illustrates a second condition used to check an end case. Subtractor 1212 subtracts environment weight sum 412 from intermediate minimum power-of-2 1208, sending its result to input a of comparator 1214. Left barrel shifter 1210 bit shifts maximum environment weight 416 to the left by low weight threshold value 368. In an embodiment, low weight threshold value 368 has a maximum bit resolution of three bits and is stored in a register. Maximum environment weight 416 is then bit shifted to the left by as much as seven bits. The bit shifted maximum environment weight 416 is sent to input b of comparator 1214.

In an embodiment, comparator 1214 determines which input is larger, sending to comparator result 1216 to multiplexor logic 1218. Comparator result 1216 is a one bit value that functions as an address identifying a data input to multiplexor logic 1218. Input 1 is intermediate minimum power-of-2 1208 bit shifted to the left by one bit and input 0 is just intermediate minimum power-of-2 1208. In an embodiment, input 0 has a maximum bit resolution of 11 bits, matching intermediate power-of-2 1208, however input 1 has a maximum bit resolution of 12 bits due to the left bit shift. The input chosen by comparator result 1216 becomes updated minimum power-of-2 420, where updated minimum power-of-2 420 has a maximum bit resolution of 12 bits. Essentially, updated minimum power-of-2 420 remains the same as intermediate minimum power-of-2 1208 if a difference between intermediate minimum power-of-2 1208 and environment weight sum 412 is larger than low weight threshold value 368 multiplied by maximum environment weight 416. Else, updated minimum power-of-2 420 becomes double intermediate minimum power-of-2 1208.

The purpose of this condition is to treat an end case where the difference between intermediate power-of-2 1208 and environment weight sum 412 is a positive low value. As described below with respect to Equation (18), the positive low value results in middle weight 418 being too small. For example, if environment weight sum 412 is 30 and intermediate power-of-2 1208 is 32, then middle weight 418 is two. This causes problems similar to those described above with respect to the first condition. To ensure middle weight 418 receives a higher value, intermediate power-of-2 1208 is compared to a baseline value, in this case low weight threshold value 368 multiplied by maximum environment weight 416, and adjusted if it is too low. The following equation numerically represents the operations carried out in FIGS. 12A-B:

if ($MP2 < STV$)

$MP2 = STV$ if (($MP2$ − Weight Sum) < $LWTV$ * Max Weight)

$$MP2 = 2*MP2 \qquad (17)$$

where MP2 in the first condition is minimum power-of-2 414, MP2 in the second condition is intermediate minimum power-of-2 1208, STV is sum threshold value 366, and LWTV is low weight threshold value 368.

Once updated minimum power-of-2 420 has been found, middle weight 418 can be calculated. In an embodiment, subtractor 1220 subtracts environment weight sum 412 from updated minimum power-of-2 420, resulting in middle weight 418. The following equation is used to represent that calculation of middle weight 418:

$$W_9 = MP2 - \text{Weight Sum} \qquad (18)$$

where MP2 is updated minimum power-of-2 420. Since updated minimum power-of-2 420 has a maximum bit resolution of 12 bits and environment weight sum 412 has a maximum bit resolution of 11 bits, middle weight 418 has a maximum bit resolution of 11 bits. In an embodiment, both middle weight 418 and updated minimum power-of-2 420 are sent to weighted average calculator 410.

In a second embodiment, not shown, the middle weight 418 is set to a value that is a multiple of maximum environment weight 416. For example, the following equation presents an algorithm for finding middle weight 418:

$$W_9 = b * \max_{k}\{W_k\}_{k=1}^{8} \qquad (19)$$

where b is any integer one, two, three, four, etc. stored in a register by parameter selector 340. In an embodiment, it is preferred that b be a power-of-2 to reduce gate counts.

Equation (19) ensures that middle weight 418 receives at least b times the highest weight of its surrounding pixels $X_1$ through $X_8$. The value of b is adjusted according to the level of de-noising desired. However, an eventual sum of weights is not necessarily a power-of-2, which would require a division to be performed, for example, by weighted average calculator 410.

Note that if the environment weight sum 412 is zero, then middle weight 418 receives a value of one. For example, this occurs if at least one of result values 364a-e is 0. Note also that updated minimum power-of-2 420 is a power-of-2, since it then becomes easier to normalize a final weighted average, as described below, without having to perform a division operation.

FIG. 13 is a more detailed diagram of weighted average calculator 410 according to an embodiment of the present invention. As shown in FIG. 13, weighted average calculator 410 includes a multiplier 1304, left barrel shifters 1306a-h, adders 1308a-d, 1310a-b, 1312, and 1314, and a right barrel shifter 1316. The components in FIG. 13 illustrate a design that is used to calculate a weighted average of the pixel values of $X_1$ through $X_9$.

Each left barrel shifter 1306a-h takes as input a pixel value of one of the middle pixel neighbors, and bit shifts each to the left by the base two logarithm of the pixel's respective environment weight 372a-h, resulting in left shift values 1324a-h. For example, the pixel value of $X_1$ is bit shifted to the left by the base two logarithm of environment weight 372a to create left shift value 1324a. Assuming 12 bit pixel values, the base two logarithms are up to three bits, meaning each pixel value is shifted to the left by up to seven bits. Left shift values 1324a-h then have a maximum bit resolution of 19 bits.

Since middle weight 418 is not necessarily a power-of-2, multiplier 1304 is required to perform the same functionality as left barrel shifters 1306a-h. In an embodiment, multiplier 1304 multiplies middle pixel value 306, $X_9$, by middle weight 418, resulting in multiplied value 1322. Since middle pixel value 306 is 12 bits and middle weight 418 has a maximum bit resolution of 11 bits, multiplied value 1322 has a maximum bit resolution of 23 bits.

Adders 1308a-d add pairs of left shift values 1324a-h to find first sums 1326a-d, which has a maximum bit resolution of 20 bits. Adders 1310a-b receive first sums 1326a-d, resulting in second sums 1328a-b that have a maximum bit resolution of 21 bits. Adder 1312 sums second sums 1328a-b to calculate third sum 1330, which has a maximum bit resolution of 22 bits. Adder 1314 then adds third sum 1330 to multiplied value 1322, sending the sum to right barrel shifter 1316, the sum having a maximum bit resolution of 23 bits. Note that the sum has a maximum bit resolution of 23 bits because, in this case, the sum of weights cannot be larger than 2048.

Finally, right barrel shifter 1316 bit shifts the sum to the right by the base two logarithm of updated minimum power-of-2 420. In an embodiment, the base two logarithms have a maximum bit resolution of four bits, meaning the sum is shifted to the right by as much as 16 bits. The output of right barrel shifter 1316 is de-noised pixel value 374. If, after bit shifting, the bit resolution of de-noised pixel value 374 is greater than the bit resolution of all other pixel values, in this case 12 bits, then de-noised pixel value 374 is scaled down to the bit resolution shared by the other pixel values. The weighted average calculation is represented by the following equation:

$$\text{De-noised} = \frac{1}{\sum_{k=1}^{9} W_k} * \sum_{k=1}^{9} W_k X_k \quad (20)$$

where environment weights 372a-h and middle weight 418 sum to a power-of-2, avoiding complex division calculations.

As described above, it is possible to control the level of de-noising by configuring the constants and threshold values determined by parameter selector 340. As an example, the following parameters is used for a first, second, and third parameter profile, assuming a 12 bit pixel resolution:

TABLE 2

| Param. Profile | 360a-i | | | 380a-e | 378a-d | 362a-d | 364a-e | 366 | 368 |
|---|---|---|---|---|---|---|---|---|---|
| 1 | 1/16 | 1/16 | 1/16 | 150, 300, 500, 800 | 16, 8, 4, 2, 1 | 60, 80, 130, 250 | 32, 4, 2, 1, 0 | 16 | 2 |
|  | 1/16 | 1/2 | 1/16 | | | | | | |
|  | 1/16 | 1/16 | 1/16 | | | | | | |
| 2 | 1/16 | 1/8 | 1/16 | 150, 300, 500, 800 | 16, 8, 4, 2, 1 | 60, 80, 130, 250 | 32, 8, 2, 1, 0 | 16 | 1 |
|  | 1/8 | 1/2 | 1/8 | | | | | | |
|  | 1/16 | 1/8 | 1/16 | | | | | | |
| 3 | 1/16 | 1/8 | 1/16 | 150, 300, 500, 800 | 16, 8, 4, 2, 1 | 100, 140, 180, 350 | 32, 16, 8, 2, 1 | 16 | 1 |
|  | 1/8 | 1/2 | 1/8 | | | | | | |
|  | 1/16 | 1/8 | 1/16 | | | | | | |

FIG. 14 illustrates a block diagram for an example mobile device 1400 in which embodiments of the present invention may be implemented. Mobile device 1400 comprises a camera assembly 1402, camera and graphics interface 1480, and a communication circuit 1490. Camera assembly 1402 includes camera lens 1436, image sensor 1472, and image processor 1474. Camera lens 1436, comprising a single lens or a plurality of lenses, collects and focuses light onto image sensor 1472. Image sensor 1472 captures images formed by light collected and focused by camera lens 1436. Image sensor 1472 may be any conventional image sensor 1472, such as a charge-coupled device (CCD) or a complementary metal oxide semiconductor (CMOS) image sensor. Image processor 1474 processes raw image data captured by image sensor 1472 for subsequent storage in memory 1496, output to a display 1426, and/or for transmission by communication circuit 1490. The image processor 1474 may be a conventional digital signal processor programmed to process image data, which is well known in the art.

Image processor 1474 interfaces with communication circuit 1490 via camera and graphics interface 1480. Communication circuit 1490 comprises antenna 1412, transceiver 1493, memory 1496, microprocessor 1492, input/output circuit 1494, audio processing circuit 1406, and user interface 1497. Transceiver 1493 is coupled to antenna 1412 for receiving and transmitting signals. Transceiver 1493 is a fully functional cellular radio transceiver, which may operate according to any known standard, including the standards known generally as the Global System for Mobile Communications (GSM), TWEIA-136, cdmaOne, cdma2000, UMTS, and Wideband CDMA.

The image processor 1474 may process images acquired by the sensor 1472 using one or more embodiments described herein. The image processor 1474 can be implemented in hardware, software, or some combination of software and hardware. For example, the image processor 1474 could be implemented as part of an application specific integrated circuit (ASIC). As another example, the image processor 1474 may be capable of accessing instructions that are stored on a computer readable medium and executing those instructions on a processor, in order to implement one or more embodiments of the present invention.

Microprocessor 1492 controls the operation of mobile device 1400, including transceiver 1493, according to programs stored in memory 1496. Microprocessor 1492 may further execute portions or the entirety of the image processing embodiments disclosed herein. Processing functions may be implemented in a single microprocessor, or in multiple microprocessors. Suitable microprocessors may include, for example, both general purpose and special purpose microprocessors and digital signal processors. Memory 1496 represents the entire hierarchy of memory in a mobile communication device, and may include both random access memory (RAM) and read-only memory (ROM). Computer program instructions and data required for operation are stored in nonvolatile memory, such as EPROM, EEPROM, and/or flash memory, which may be implemented as discrete devices, stacked devices, or integrated with microprocessor 1492.

Input/output circuit 1494 interfaces microprocessor 1492 with image processor 1474 of camera assembly 1402 via camera and graphics interface 1480. Camera and graphics interface 1480 may also interface image processor 1474 with user interface 1497 according to any method known in the art. In addition, input/output circuit 1494 interfaces microprocessor 1492, transceiver 1493, audio processing circuit 1406, and user interface 1497 of communication circuit 1490. User interface 1497 includes a display 1426, speaker 1428, microphone 1438, and keypad 1440. Display 1426, disposed on the back of display section, allows the operator to see dialed digits, images, called status, menu options, and other service information. Keypad 1440 includes an alphanumeric keypad and may optionally include a navigation control, such as joystick control (not shown) as is well known in the art. Further, keypad 1440 may comprise a full QWERTY keyboard, such as those used with palmtop computers or smart phones. Keypad 1440 allows the operator to dial numbers, enter commands, and select options.

Microphone 1438 converts the user's speech into electrical audio signals. audio processing circuit 1406 accepts the analog audio inputs from microphone 1438, processes these signals, and provides the processed signals to transceiver 1493 via input/output 1494. Audio signals received by transceiver 1493 are processed by audio processing circuit 1406. The basic analog output signals produced by processed audio processing circuit 1406 are provided to speaker 1428. Speaker 1428 then converts the analog audio signals into audible signals that can be heard by the user.

Those skilled in the art will appreciate that one or more elements shown in FIG. 14 may be combined. For example, while the camera and graphics interface 1480 is shown as a separated component in FIG. 14, it will be understood that camera and graphics interface 1480 may be incorporated with input/output circuit 1494. Further, microprocessor 1492, input/output circuit 1494, audio processing circuit 1406, image processor 1474, and/or memory 1496 may be incorporated into a specially designed application-specific integrated circuit (ASIC) 1491.

FIG. 15 is a block diagram that illustrates a computer system 1500 upon which one or more embodiments of the invention may be implemented. Computer system 1500 includes a bus 1502 or other communication mechanism for communicating information, and a processor 1504 coupled with bus 1502 for processing information. Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Computer system 1500 further includes a read only memory (ROM) 1508 or other static storage device coupled to bus 1502 for storing static information and instructions for processor 1504. A storage device 1510, such as a magnetic disk or optical disk, is provided and coupled to bus 1502 for storing information and instructions.

Computer system 1500 may be coupled via bus 1502 to a display 1512, such as a cathode ray tube (CRT), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane. The computer system 1500 may further include an audio/video input device 1515 such as a microphone or camera to supply audible sounds, still images, or motion video, any of which may be processed using the embodiments described above.

Various processing techniques disclosed herein may be implemented to process data on a computer system 1500. According to one embodiment of the invention, those techniques are performed by computer system 1500 in response to processor 1504 executing one or more sequences of one or more instructions contained in main memory 1506. Such instructions may be read into main memory 1506 from another machine-readable medium, such as storage device 1510. Execution of the sequences of instructions contained in main memory 1506 causes processor 1504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1500, various machine-readable media are involved, for example, in providing instructions to processor 1504 for execution. Such a medium may take many forms, including but not limited to storage media and transmission media. Storage media includes both non-volatile media and volatile media. Non-volatile media includes, for example, optical or magnetic disks, such as storage device 1510. Volatile media includes dynamic memory, such as main memory 1506. Transmission media includes coaxial cables, copper wire and fiber optics, including the wires that comprise bus 1502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1504 for execution. For example, the instructions may initially be carried on a magnetic disk of a remote computer. The remote computer can load the instructions into its dynamic memory and send the instructions over a telephone line using a modem. A modem local to computer system 1500 can receive the data on the telephone line and use an infra-red transmitter to convert the data to an infrared signal. An infrared detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through, local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of carrier waves transporting the information.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518.

The received code may be executed by processor 1504 as it is received, and/or stored in storage device 1510, or other non-volatile storage for later execution. In this manner, computer system 1500 may obtain application code in the form of a carrier wave.

Data that is processed by the embodiments of program code as described herein may be obtained from a variety of sources, including but not limited to an A/V input device 1515, storage device 1510, and communication interface 1518.

FIG. 16 is a flowchart of a method 1600 for calculating a de-noised pixel value for a middle pixel of an image window according to an embodiment of the present invention. While method 1600 is described with respect to an embodiment of the present invention, method 1600 is not meant to be limited to the present invention and can be used in other applications. In an example, method 1600 is used to calculate de-noised pixel value 374 of FIG. 3. However, method 1600 is not meant to be limited to de-noised pixel value 374. As shown in FIG. 16, method 1600 begins at stage 1602 where an image window is received. In an embodiment, the image window is at least a portion of an image being processed by an ISP chain and received by a de-noiser module. The image window consists of pixel values aligned in rows and columns. Once stage 1602 is complete, method 1600 proceeds to stage 1604.

At stage 1604, a middle pixel and pixels that neighbor the middle pixel are identified. The neighbor pixels are those pixels within a pixel of the middle pixel. In an embodiment, the middle pixel has eight neighbor pixels. Differences in pixel values between the middle pixel and the neighbor pixels are calculated. In an embodiment, these differences numerically explain how close or far an environment of a given neighbor pixel is to an environment of the middle pixel, and are referred to as environment distances. Once stage 1604 is complete, method 1600 continues to stage 1606.

At stage 1606, threshold values that are later used to determine environment weights may be adjusted. In an embodiment, the threshold values are adjusted based on a signal level of the image window. Once stage 1606 is complete, method 1600 continues to stage 1608.

In a first alternate embodiment, not shown, stage 1606 can occur before stage 1604. In a second alternate embodiment, not shown, stage 1604 and stage 1606 can occur simultaneously.

At stage 1608, the environment distances calculated in stage 1604 and the threshold values adjusted in stage 1606 are used to calculate environment weights for each neighbor pixel. In an embodiment, the environment weights and inversely related to the environment distances since smaller environment distances are more desirable. Once stage 1608 is complete, method 1600 proceeds to stage 1610.

At stage 1610, a weight for the middle pixel is determined. In an embodiment, this weight is dependent on the weights of the neighboring pixels. For example, the middle pixel weight is dependent on the sum of the neighbor pixel weights, the largest neighbor pixel weight, and a minimum power-of-2 that is greater than the sum of neighbor pixel weights. Once stage 1610 is complete, method 1600 continues to stage 1612.

At stage 1612, the de-noised pixel value is calculated. In an embodiment, the de-noised pixel value is based on a weighted average of all the weights. For example, each weight of the neighbor pixels and the middle pixel is multiplied by their respective pixel values and summed. The sum is then divided by the total sum of the weights. In an embodiment, this calculated de-noised pixel value replaces the original pixel value of the middle pixel in the image window. Once stage 1612 is complete, method 1600 proceeds to stage 1614.

At stage 1614, a condition is checked to determine whether further pixels in the image from which the image window originated need to be de-noised. If more pixels need to be de-noised, then method 1600 jumps back to stage 1602, where a new image window is received. If no more pixels need to be de-noised, then method 1600 ends.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   (a) comparing a value of a first pixel to values of a set of other pixels, wherein the first pixel and the set of other pixels are each of a first color;
   wherein step (a) comprises defining a first environment comprising the first pixel and the at least two pixels neighboring the first pixel;
   (b) for each pixel in the set of other pixels, comparing values of at least two pixels neighboring the first pixel to values of at least two further pixels neighboring the other pixel, wherein one of the at least two pixels neighboring the first pixel is of a second color and the other of a third color, and wherein one of the at least two further pixels neighboring the other pixel is of the second color and the other of the third color;
   wherein step (b) comprises, for each pixel in the set of other pixels, defining an environment comprising the other pixel and the at least two pixels neighboring the other pixel, and determining a difference value that numerically represents how similar the environment defined for the other pixel is to the environment defined for the first pixel;
   (c) determining, for each pixel in the set of other pixels, a weight based at least in part on results of steps (a) and (b);
   wherein step (c) comprises determining at least one threshold value, comparing the at least one threshold value to each of the difference values determined in step (b), and for each pixel in the set of other pixels, determining the weight for the other pixel based at least in part on the comparison of the at least one threshold value to the difference value determined for the other pixel;
   (d) calculating a de-noised pixel value based at least in part on the weights of each pixel in the set of other pixels; and
   (e) replacing the value of the first pixel with the de-noised pixel value.

2. The method of claim 1, wherein step (d) comprises:
   summing the weights of each pixel in the set of other pixels;
   calculating a lowest power of two that is greater than the sum of the weights; and
   calculating the de-noised pixel value as a function of the lowest power of two and the sum of the weights.

3. The method of claim 2, wherein the lowest power of two is adjusted prior to calculating the de-noised pixel value if a difference between the lowest power of two and the sum of the weights is lower than a predetermined value.

4. The method of claim 2, wherein the lowest power of two is adjusted prior to calculating the de-noised pixel value if the lowest power of two is lower than a predetermined value.

5. The method of claim 2, wherein calculating the de-noised pixel value comprises:
   calculating a weighted average of the weights of each pixel in the set of other pixels and the weight of the first pixel, wherein the weight of the first pixel is based on the lowest power of two and the sum of the weights; and
   setting the de-noised pixel value equal to the weighted average.

6. The method of claim 5, wherein the weighted average is calculated by shifting bits in a register.

7. The method of claim 1, wherein step (a) comprises:
   calculating, for each pixel in the set of other pixels, a difference between the value of the first pixel and the value of the other pixel.

8. The method of claim 7, wherein step (b) comprises:
   for each pixel in the set of other pixels, calculating, for each pixel of the at least two pixels neighboring the first pixel, a difference between the value of the pixel neighboring the first pixel and the value of a corresponding pixel of the at least two further pixels neighboring the other pixel,
   wherein location, relative to the first pixel, of the pixel neighboring the first pixel and location, relative to the other pixel, of the corresponding pixel determines which of the at least two further pixels corresponds to the pixel neighboring the first pixels.

9. The method of claim 8, wherein the calculated differences of steps (a) and (b) are based on a spatial weight matrix.

10. The method of claim 8, wherein step (c) comprises:
    adjusting a threshold value, wherein the adjustment is based on a signal level, and wherein the signal level is dependent on at least one of the value of the first pixel and the values of the set of other pixels;
    comparing the adjusted threshold value and the calculated differences of steps (a) and (b); and
    determining the weight of each pixel in the set of other pixels based on the comparison.

11. The method of claim 1, further comprising:
    (g) outputting an image for further processing by an image processor apparatus.

12. The method of claim 1, wherein determining the at least one threshold value comprises adjusting an initial threshold value based at least in part on a signal scaling factor to produce the at least one threshold value.

13. A system comprising:
    a distance calculator that compares a value of a first pixel with values of a set of other pixels, wherein the first pixel and the set of other pixels are each of a first color, and that, for each pixel in the set of other pixels, compares values of at least two pixels neighboring the first pixel with values of at least two further pixels neighboring the other pixel, wherein one of the at least two pixels neighboring the first pixel is of a second color and the other of a third color, and wherein one of the at least two further pixels neighboring the other pixel is of the second color, and the other of the third color;
    wherein the distance calculator defines a first environment comprising the first pixel and the at least two pixels neighboring the first pixel;
    wherein the distance calculator, for each pixel in the set of other pixels, defines an environment comprising the other pixel and the at least two pixels neighboring the other pixel, and determines a difference value that numerically represents how similar the environment defined for the other pixel is to the environment defined for the first pixel;
    a weight calculator that determines, for each pixel in the set of other pixels, a weight based at least in part on results of the distance calculator;
    wherein the weight calculator determines at least one threshold value, compares the at least one threshold value to each of the difference values determined by the distance calculator, and for each pixel in the set of other pixels, determines the weight for the other pixel based at least in part on the comparison of the at least one threshold value to the difference value determined for the other pixel; and a de-noised pixel calculator that calculates a de-noised pixel value based at least in part on the weights of each pixel in the set of other pixels, and that replaces the value of the first pixel with the de-noised pixel value.

14. The system of claim 13, wherein the de-noised pixel calculator comprises:
a weight adder that sums the weights of each pixel in the set of other pixels;
a minimum power-of-2 calculator that calculates a lowest power of two that is greater than the sum of the weights; and
a weighted average calculator that calculates the de-noised pixel value as a function of the lowest power of two and the sum of the weights.

15. The system of claim 14, wherein the de-noised pixel calculator further comprises a middle weight calculator that adjusts the lowest power of two prior to the weighted average calculator calculating the de-noised pixel value if a difference between the lowest power of two and the sum of the weights is lower than a predetermined value.

16. The system of claim 14, wherein the de-noised pixel calculator further comprises a middle weight calculator that adjusts the lowest power of two prior to the weighted average calculator calculating the de-noised pixel value if the lowest power of two is lower than a predetermined value.

17. The system of claim 14, wherein the weighted average calculator calculates a weighted average of the weights of each pixel in the set of other pixels and the weight of the first pixel, wherein the weight of the first pixel is based on the lowest power of two and the sum of the weights, and sets the de-noised pixel value equal to the weighted average.

18. The system of claim 17, wherein the weighted average calculator calculates the weighted average by shifting bits in a register.

19. The system of claim 13, wherein the distance calculator calculates, for each pixel in the set of other pixels, a difference between the value of the first pixel and the value of the other pixel.

20. The system of claim 19, wherein the distance calculator, for each pixel in the set of other pixels, calculates, for each pixel of the at least two pixels neighboring the first pixel, a difference between the value of the pixel neighboring the first pixel and the value of a corresponding pixel of the at least two further pixels neighboring the other pixel, wherein location, relative to the first pixel, of the pixel neighboring the first pixel and location, relative to the other pixel, of the corresponding pixel determines which at the at least two further pixels corresponds to the pixel neighboring the first pixel.

21. The system of claim 20, wherein the differences calculated by the distance calculator are based on a spatial weight matrix.

22. The system of claim 20, wherein the weight calculator comprises:
a barrel shifter that adjusts a threshold value, wherein the adjustment is based on a signal level, and wherein the signal level is dependent on at least one of the value of the first pixel and the values of the set of other pixels;
a comparator that compares the adjusted threshold value and differences calculated by the distance calculator;
and multiplexor logic that determines the weight of each pixel in the set of other pixels based on a result of the comparator.

23. The system of claim 13, wherein the de-noised pixel calculator outputs an image for further processing.

24. The system of claim 13, wherein the weight calculator determines the at least one threshold value by at least adjusting an initial threshold value based at least in part on a signal scaling factor to produce the at least one threshold value.

25. A tangible non-transitory computer usable medium, having computer readable program code embodied thereon, the computer readable program code comprising:
first computer readable program code, which when executed by a computing device, causes the computing device to implement a distance calculator that compares a value of a first pixel with values of a set of other pixels, wherein the first pixel and the set of other pixels are each of a first color, and that, for each pixel in the set of other pixels, compares values of at least two pixels neighboring the first pixel with values of at least two further pixels neighboring the other pixel, wherein one of the at least two pixels neighboring the first pixel is of a second color and the other of a third color, and wherein one of the at least two further pixels neighboring the other pixel is of the second color, and the other of the third color;
wherein the distance calculator defines a first environment comprising the first pixel and the at least two pixels neighboring the first pixel;
wherein the distance calculator, for each pixel in the set of other pixels, defines an environment comprising the other pixel and the at least two pixels neighboring the other pixel, and determines a difference value that numerically represents how similar the environment defined for the other pixel is to the environment defined for the first pixel;
second computer readable program code, which when executed by the computing device, causes the computing device to implement a weight calculator that determines, for each pixel in the set of other pixels, a weight based at least in part on results of the distance calculator;
wherein the weight calculator determines at least one threshold value, compares the at least one threshold value to each of the difference values determined by the distance calculator, and for each pixel in the set of other pixels, determines the weight for the other pixel based at least in part on the comparison of the at least one threshold value to the difference value determined for the other pixel; and
third computer readable program code, which when executed by the computing the computing device to implement a de-noised pixel calculator that calculates a de-noised pixel value based at least in part on the weights of each pixel in the set of other pixels, and that replaces the value of the first pixel with the de-noised pixel value.

26. The computer usable medium of claim 25, wherein the de-noised pixel calculator:
sums the weights of each pixel in the set of other pixels;
calculates a lowest power of two that is greater than the sum of the weights; and
calculates the de-noised pixel value as a function of the lowest power of two and the sum of the weights.

27. The computer usable medium of claim 26, wherein the de-noised pixel calculator further adjusts the lowest power of two prior to the weighted average calculator calculating the de-noised pixel value if a difference between the lowest power of two and the sum of the weights is lower than a predetermined value.

28. The computer usable medium of claim 26, wherein the de-noised pixel calculator calculates the de-noised pixel value by calculating a weighted average of the weights of each pixel in the set of other pixels and the weight of the first pixel, wherein the weight of the first pixel is based on the lowest power of two and the sum of the weights, and sets the de-noised pixel value equal to the weighted average.

29. The computer usable medium of claim 26, wherein the de-noised pixel calculator calculates the de-noised pixel value by calculating a weighted average of the weights of each pixel in the set of other pixels and the weight of the first pixel, wherein the weight of the first pixel is based on the lowest power of two and the sum of the weights, and sets the de-noised pixel value equal to the weighted average.

30. The computer usable medium of claim 25, wherein the distance calculator calculates, for each pixel in the set of other pixels, a difference between the value of the first pixel and the value of the other pixel.

31. The computer usable medium of claim 30, wherein the distance calculator, for each pixel in the set of other pixels, calculates, for each pixel of the at least two pixels neighboring the first pixel, a difference between the value of the pixel neighboring the first pixel and the value of a corresponding pixel of the at least two further pixels neighboring the other pixel, wherein location, relative to the first pixel, of the pixel neighboring the first pixel and location, relative to the other pixel, of the corresponding pixel determines which at the at least two further pixels corresponds to the pixel neighboring the first pixel.

32. The computer usable medium of claim 31, wherein the differences calculated by the distance calculator are based on a spatial weight matrix.

33. The computer usable medium of claim 31, wherein the weight calculator:
    adjusts a threshold value, wherein the adjustment is based on a signal level, and wherein the signal level is dependent on at least one of the value of the first pixel and the values of the set of other pixels;
    compares the adjusted threshold value and differences calculated by the distance calculator; and
    determines the weight of each pixel in the set of other pixels based on a result of the comparator.

34. The computer usable medium of claim 25, wherein the de-noised pixel calculator outputs an image for further processing.

35. The computer usable medium of claim 25, wherein the weight calculator determines the at least one threshold value by at least adjusting an initial threshold value based at least in part on a signal scaling factor to produce the at least one threshold value.

* * * * *